US012548511B2

(12) United States Patent
He et al.

(10) Patent No.: US 12,548,511 B2
(45) Date of Patent: Feb. 10, 2026

(54) DISPLAY PANEL, DRIVING METHOD THEREOF AND DISPLAY DEVICE THEREOF

(71) Applicants: Wuhan Tianma Micro-Electronics Co., Ltd., Wuhan (CN); Wuhan Tianma Micro-Electronics Co., Ltd. Shanghai Branch, Shanghai (CN)

(72) Inventors: Mengjia He, Wuhan (CN); Yana Gao, Wuhan (CN); Mengmeng Zhang, Wuhan (CN); Xingyao Zhou, Wuhan (CN); Gaojun Huang, Wuhan (CN)

(73) Assignees: Wuhan Tianma Micro-Electronics Co, Ltd., Wuhan (CN); Wuhan Tianma Micro-Electronics Co, Ltd. Shanghai Branch, Shanghai (CN)

( * ) Notice: Subject to any disclaimer, the term of this patent is extended or adjusted under 35 U.S.C. 154(b) by 0 days.

(21) Appl. No.: 18/763,900

(22) Filed: Jul. 3, 2024

(65) Prior Publication Data

US 2025/0037655 A1 Jan. 30, 2025

(30) Foreign Application Priority Data

Jul. 24, 2023 (CN) ......................... 202310913842.5

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01);
(Continued)

(58) Field of Classification Search
CPC ......... G09G 3/3233; G09G 2300/0819; G09G 2300/0842; G09G 2300/0861;
(Continued)

(56) References Cited

U.S. PATENT DOCUMENTS 11,749,196 B1 * 9/2023 Kim ......................... G09G 3/32 345/211
2011/0025678 A1 2/2011 Chung
(Continued)

FOREIGN PATENT DOCUMENTS

CN 106847190 A 6/2017
CN 113012643 A 6/2021
(Continued)

*Primary Examiner* — Tom V Sheng
(74) *Attorney, Agent, or Firm* — Anova Law Group, PLLC

(57) ABSTRACT

Display panel, driving method, and display device are provided. The display panel includes sub-pixels and data lines. A sub-pixel includes a pixel circuit and a light emitting element. The pixel circuit includes a data writing module electrically connected to a driving transistor, and a data line reset module. A first terminal of the data line reset module is electrically connected to a data line, a second terminal of the data line reset module is electrically connected to a data line reset signal terminal. An operation stage of the pixel circuit at least includes a data writing stage. In the data writing stage, the data writing module transmits a data voltage signal to the driving transistor. The operation stage also includes a data line reset stage. In the data line reset stage, the data line reset signal terminal transmits a data line reset signal to the data line.

19 Claims, 21 Drawing Sheets

(52) U.S. Cl.
CPC . *G09G 2300/0861* (2013.01); *G09G 2310/08* (2013.01); *G09G 2320/0209* (2013.01); *G09G 2320/0233* (2013.01); *G09G 2330/021* (2013.01)

(58) Field of Classification Search
CPC ....... G09G 2310/08; G09G 2320/0209; G09G 2320/0233; G09G 2330/021
USPC .......................................................... 345/690
See application file for complete search history.

(56) References Cited

U.S. PATENT DOCUMENTS

| | | | | |
|---|---|---|---|---|
| 2012/0105501 | A1* | 5/2012 | Nakamura | G09G 3/3233 345/77 |
| 2013/0057532 | A1* | 3/2013 | Lee | G09G 3/3225 345/76 |
| 2014/0139505 | A1* | 5/2014 | Han | H04N 13/398 345/212 |
| 2015/0123557 | A1* | 5/2015 | Lee | G09G 3/3233 315/228 |
| 2016/0379560 | A1* | 12/2016 | Cho | G09G 3/3233 345/76 |
| 2017/0200417 | A1* | 7/2017 | Wu | G09G 3/3291 |
| 2017/0249904 | A1* | 8/2017 | Li | G09G 3/3233 |
| 2018/0226029 | A1* | 8/2018 | Park | G09G 3/3266 |
| 2018/0240400 | A1* | 8/2018 | Zhou | G09G 3/3233 |
| 2019/0114960 | A1* | 4/2019 | Lee | G09G 3/3225 |
| 2019/0259331 | A1* | 8/2019 | Na | G09G 3/3233 |
| 2020/0243012 | A1* | 7/2020 | Jin | H10D 86/423 |
| 2021/0142733 | A1* | 5/2021 | Kim | G09G 3/3266 |
| 2021/0201832 | A1* | 7/2021 | Lim | G09G 3/3266 |
| 2021/0335234 | A1* | 10/2021 | Yin | G09G 3/3291 |
| 2021/0335248 | A1* | 10/2021 | Feng | G09G 3/3258 |
| 2022/0277691 | A1* | 9/2022 | Wang | H10K 59/131 |
| 2022/0375408 | A1* | 11/2022 | Dong | G09G 3/3241 |
| 2023/0154400 | A1* | 5/2023 | Yin | G09G 3/3233 345/204 |
| 2023/0215359 | A1* | 7/2023 | Lee | G09G 3/2007 345/690 |
| 2023/0377508 | A1* | 11/2023 | Zhou | H10K 59/131 |
| 2024/0112630 | A1* | 4/2024 | Bae | G09G 3/3233 |
| 2024/0194144 | A1* | 6/2024 | Li | G09G 3/3275 |
| 2024/0355265 | A1* | 10/2024 | Wang | G09G 3/20 |
| 2024/0365609 | A1* | 10/2024 | Yang | H10K 59/131 |

FOREIGN PATENT DOCUMENTS

| | | |
|---|---|---|
| CN | 113838420 A | 12/2021 |
| CN | 114863874 A | 8/2022 |

* cited by examiner

DISPLAY PANEL, DRIVING METHOD THEREOF AND DISPLAY DEVICE THEREOF

CROSS-REFERENCE TO RELATED APPLICATION

This application claims priority of Chinese Patent Application No. 202310913842.5, filed on Jul. 24, 2023, the entire content of which is hereby incorporated by reference.

FIELD OF THE DISCLOSURE

The present disclosure generally relates to the field of display technology and, more particularly, relates to a display panel, a driving method thereof, and a display device thereof.

BACKGROUND

Organic Light Emitting Diodes (OLEDs) are one of the hot spots in the field of display research nowadays. Compared with Liquid Crystal Display (LCD), OLEDs are more and more used in high-performance display due to their characteristics such as self-illumination, fast responses, wide viewing angles, and capabilities to be produced on flexible substrates. Pixel circuit design is a core technical content of OLED display and has important research significance.

In existing panel design, the scanning turn-on time of each row may be short, and the writing time of the data voltage signal may be insufficient. Accordingly, compensation for the threshold value of the driving transistor in the pixel circuit may be insufficient, and display uniformity may thus be affected. Improvement of the display effects may result in an increase of power consumption. In addition, residual voltages on data lines of different display frames may cause crosstalk between three primary color (RGB) display data in the panel structure, and the display quality may thus be affected.

As such, providing a display panel, a driving method, and a display device that may not only improve display effects but also reduce power consumption is an urgent technical problem that needs to be solved.

SUMMARY

One aspect of the present disclosure includes a display panel. The display panel includes a plurality of sub-pixels and a plurality of data lines. A sub-pixel of the plurality of sub-pixels includes a pixel circuit and a light emitting element electrically connected to the pixel circuit. The pixel circuit includes a data writing module electrically connected to a driving transistor, and a data line reset module. A first terminal of the data line reset module is electrically connected to a data line of the plurality of data lines, a second terminal of the data line reset module is electrically connected to a data line reset signal terminal, and the data writing module is electrically connected to the data line. An operation stage of the pixel circuit at least includes a data writing stage, and in the data writing stage, the data writing module is turned on and transmits a data voltage signal of the data line to the driving transistor. Before the data writing stage, the operation stage also includes a data line reset stage, and in the data line reset stage, the data line reset module is turned on, and the data line reset signal terminal transmits a data line reset signal to the data line through the data line reset module.

Another aspect of the present disclosure includes driving method for a display panel. The driving method includes a data line reset stage and a data writing stage. The display panel includes a plurality of sub-pixels and a plurality of data lines. A sub-pixel of the plurality of sub-pixels includes a pixel circuit and a light emitting element electrically connected to the pixel circuit, the pixel circuit includes a data writing module electrically connected to a driving transistor and a data line reset module, a first terminal of the data line reset module is electrically connected to a data line of the plurality of data lines, a second terminal of the data line reset module is electrically connected to a data line reset signal terminal, and the data writing module is electrically connected to the data line. The data line reset stage is executed before the data writing stage. In the data line reset stage, the data line reset module is turned on, and the data line reset signal terminal transmits a data line reset signal to the data line through the data line reset module to reset the data line. In the data writing stage, the data writing module is turned on, and transmits a data voltage signal of the data line to the driving transistor.

Another aspect of the present disclosure includes a display device. The display device includes a display panel. The display panel includes a plurality of sub-pixels and a plurality of data lines. A sub-pixel of the plurality of sub-pixels includes a pixel circuit and a light emitting element electrically connected to the pixel circuit. The pixel circuit includes a data writing module electrically connected to a driving transistor, and a data line reset module. A first terminal of the data line reset module is electrically connected to a data line of the plurality of data lines, a second terminal of the data line reset module is electrically connected to a data line reset signal terminal, and the data writing module is electrically connected to the data line. An operation stage of the pixel circuit at least includes a data writing stage, and in the data writing stage, the data writing module is turned on and transmits a data voltage signal of the data line to the driving transistor. Before the data writing stage, the operation stage also includes a data line reset stage, and in the data line reset stage, the data line reset module is turned on, and the data line reset signal terminal transmits a data line reset signal to the data line through the data line reset module.

Other aspects of the present disclosure may be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
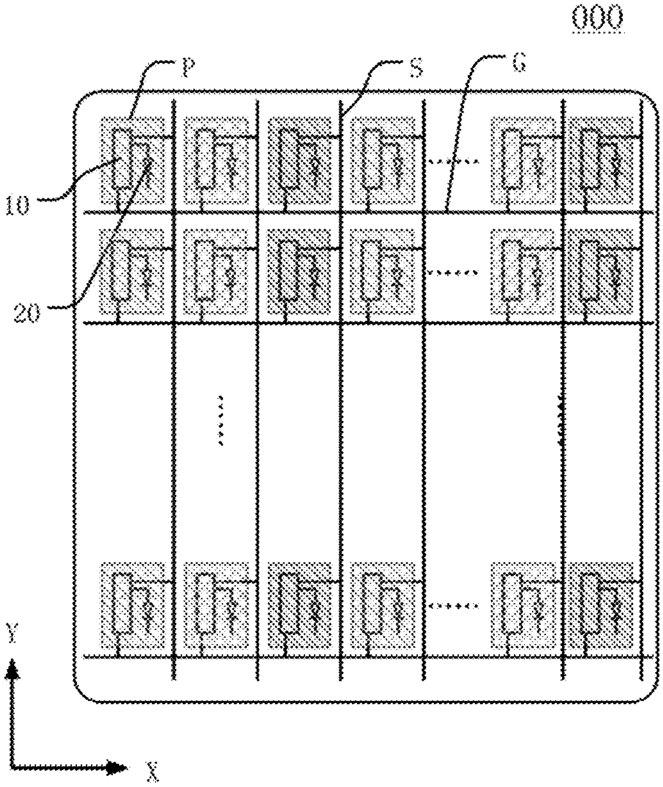
FIG. 1 illustrates a schematic diagram of a plan structure of a display panel consistent with the disclosed embodiments of the present disclosure.

To make the objectives, technical solutions and advantages of the present disclosure clearer and more explicit, the present disclosure is described in further detail with accompanying drawings and embodiments. It should be understood that the specific exemplary embodiments described herein are only for explaining the present disclosure and are not intended to limit the present disclosure.

Technologies, methods, and equipment known to those of ordinary skill in relevant fields may not be discussed in detail, but where appropriate, these technologies, methods, and equipment should be regarded as part of the specification.

Reference will now be made in detail to embodiments of the present disclosure, which are illustrated in the accompanying drawings. Similar labels and letters designate similar items in the drawings. Once an item is defined in one drawing, the item may not be defined and discussed in subsequent drawings.

Figure 2:
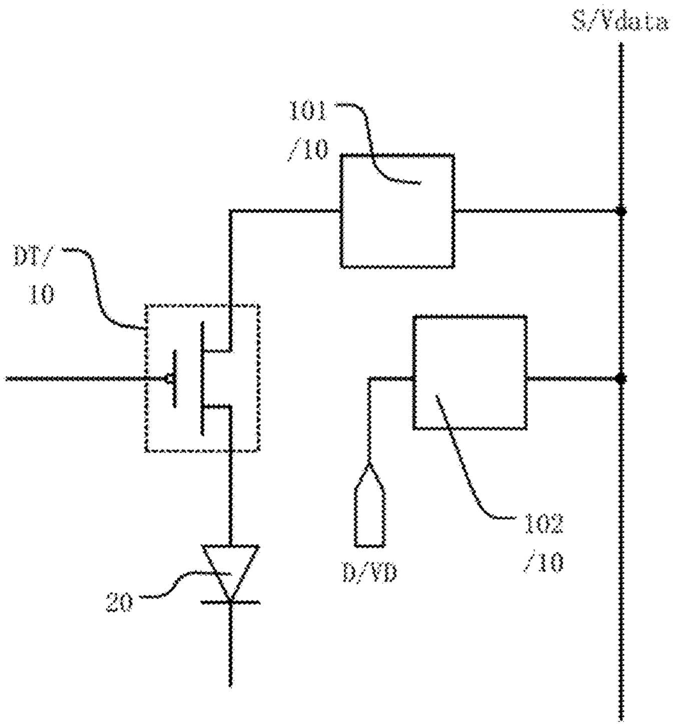
FIG. 2 illustrates a schematic diagram of an electrical connection structure of a sub-pixel in FIG. 1, consistent with the disclosed embodiments of the present disclosure.

FIG. 1 illustrates a schematic diagram of a plan structure of a display panel consistent with the disclosed embodiments of the present disclosure. FIG. 2 illustrates a schematic diagram of an electrical connection structure of a sub-pixel in FIG. 1. Referring to FIGS. 1 and 2, the present disclosure provides a display panel 000, including a plurality of sub-pixels P. The sub-pixel P includes an electrically connected pixel circuit 10 and a light emitting element 20. The pixel circuit 10 includes a data writing module 101 and a data line reset module 102 electrically connected to a driving transistor DT.

The display panel 000 may also include a plurality of data lines S. A first terminal of the data line reset module 102 is electrically connected to the data line S. A second terminal of the data line reset module 102 is electrically connected to a data line reset signal terminal D. The data writing module 101 is electrically connected to the data line S.

An operation stage of the pixel circuit 10 at least includes a data writing stage. In the data writing stage, the data writing module 101 is turned on and transmits a data voltage signal Vdata of the data line S to the driving transistor DT.

Before the data writing stage, the operation stage may also include a data line reset stage. In the data line reset stage, the data line reset module 102 is turned on, and the data line reset signal terminal D transmits a data line reset signal to the data line S through the data line reset module 102.

Specifically, in one embodiment, the display panel 000 may be an organic light emitting diode display panel. The display panel 000 may include a plurality of sub-pixels P. Optionally, the plurality of sub-pixels P may include a plurality of different colors (illustrated with different filling patterns in FIG. 1). For example, the plurality of may at least include red sub-pixels, green sub-pixels, blue sub-pixels, and may also include white sub-pixels. The present disclosure does not limit specific colors of the sub-pixels. Optionally, the plurality of sub-pixels P may be arranged in an array on the display panel 000, or may be arranged in other ways. FIG. 1 only takes an array arrangement of the sub-pixels P as an example for illustration. It may be understood that, in FIG. 1, as an example, an orthographic projection shape of a sub-pixel P onto a light emitting surface of the display panel 000 is a strip. In specific implementation, the shape of the sub-pixel P includes but is not limited to a strip. For example, the sub-pixel may be designed as a circle or a polygon, and may be specifically designed according to actual needs.

Referring to FIG. 2, in one embodiment, the sub-pixel P includes a pixel circuit 10 and a light emitting element 20 electrically connected to the pixel circuit 10. Optionally, the light emitting element 20 may be an organic light emitting diode. The pixel circuit 10 included in the sub-pixel P may be used to transmit light emitting driving current to the light emitting element 20 under action of signals from driving signal lines (such as scanning lines, data lines, power signal lines, etc., not shown in FIG. 2) on the display panel 000. Accordingly, the driving current may be transmitted to the light emitting element 20 to make the light emitting element 20 to emit light. The present disclosure does not elaborate on the light emitting principle of the sub-pixel P in the display panel 000.

In one embodiment, the display panel 000 includes a plurality of data lines S. Optionally, the display panel 000 may also include a plurality of scan lines G. Extension directions of the scan lines G and the data lines S may intersect or be perpendicular to each other. As shown in FIG. 1, the scan line G extends along a first direction X, and the data line S extends along a second direction Y. The pixel circuit 10 includes a data writing module 101 electrically connected to the driving transistor DT. Optionally, one of the source or the drain of the driving transistor DT is electrically connected to one terminal of the data writing module 101, and the other of the source or the drain of the driving transistor DT is electrically connected to the light emitting element 20. The driving transistor DT of the pixel circuit 10 may be used to generate driving current for driving the light emitting element 20 to emit light, thereby realizing the light emitting function of the light emitting element 20.

The data writing module 101 is electrically connected to the data line S. Optionally, a first terminal of the data writing module 101 may be electrically connected to one of the source or the drain of the driving transistor DT, and the second terminal of the data writing module 101 may be electrically connected to the data line S. In one embodiment, an operation stage of the pixel circuit 10 at least includes a data writing stage. In the data writing stage, the data writing module 101 is turned on, that is, the first terminal and the second terminal of the data writing module 101 are connected. A data voltage signal Vdata transmitted on the data line S may be transmitted to the driving transistor DT through the data line S. Optionally, the operation stage of the pixel circuit 10 may also include a light emitting stage located after the data writing stage. In the light emitting stage, the driving transistor DT generates the driving current to drive the light emitting element 20 to emit light, achieving the light emitting function of the light emitting element 20.

In existing panel design, as the resolution of a display panel increases, the scanning turn-on time of each row of sub-pixels P controlled by the scanning line G may become shorter. As such, the writing time of the data voltage signal Vdata on the data line S may be insufficient, and threshold compensation for the driving transistor DT in the pixel circuit 10 may be insufficient. Accordingly, display uniformity may be affected. In existing technologies, to improve the display effect, the data writing time may be increased, and power consumption may thus be increased. Moreover, in different display frames of the display panel 000, the residual voltage signal on the data line S after a previous frame is completed may affect the signal transmission of the data line S in a next frame. Accordingly, crosstalk between display data in the panel structure may appear, and display quality may be affected.

In one embodiment, the pixel circuit 10 also includes a data line reset module 102. A first terminal of the data line reset module 102 is electrically connected to the data line S, and a second terminal of the data line reset module 102 is electrically connected to the data line reset signal terminal D. The data line reset signal terminal D may be used to provide a data line reset signal. In one embodiment, the operation stage of the pixel circuit 10 also includes a data line reset stage, and the data line reset stage may be performed before the data writing stage. When the pixel circuit 10 operates in the data line reset stage, the data line reset module 102 is turned on, that is, the first terminal and the second terminal of the data line reset module 102 are connected. The data line reset signal provided by the data line reset signal terminal D electrically connected to the second terminal of the data line reset module 102 may be transmitted to the data line S to reset the data line S. Accordingly, the data line reset signal provided by the data line reset signal terminal D may be used to clear the remaining data voltage value on the data line S of the previous frame before the next frame starts, so as to reset the data line S. As such, the data voltage signal Vdata provided on the data line S of the next frame may avoid the interference by the residual value of the previous frame as much as possible. Then, in the data writing stage of the next frame, the data voltage signal Vdata on the data line S may be fast and fully written into the driving transistor DT through the data writing module 101. Accordingly, the problem of insufficient threshold compensation of the driving transistor DT in the pixel circuit 10 may be addressed, and display uniformity and display quality may be improved. Furthermore, the increase of the time of the data writing stage may not be needed, and power consumption may be reduced.

It may be understood that, in one embodiment, the reset signal terminal D of the data line may be connected to the signal wiring in the display panel 000. The data line reset signal may be provided to the data line reset signal terminal D through the signal wiring provided in the display panel 000. The present disclosure does not limit specific values of the data line reset signal, provided that the residual value of a previous frame on the data line S may be cleared such that the data line S may be reset.

It may be understood that FIGS. 1 and 2 take the driving transistor DT as a P-type transistor as an example for illustration. In specific implementation, the driving transistor DT may also be an N-type transistor. The present disclosure does limit a specific type of the driving transistor DT.

It should be noted that the structure of the display panel 000 includes but is not limited to above-described structures. In specific implementation, the display panel 000 may also include other structures capable of realizing the display function, which will not be elaborated here.

Optionally, in one embodiment, the data line reset signal provided by the data line reset signal terminal D electrically connected to the second terminal of the data line reset module 102 may be a low voltage signal VD (ie, the data line reset signal), where VD<Vmin. The light emitting element 20 may include a blue light emitting element, and Vmin is a value of the data voltage signal Vdata-B required by the blue light emitting element at the highest brightness.

In one embodiment, to make the low-level data voltage signal Vdata transmitted on the data line S be normally written into the gate of the driving transistor DT in the data writing stage, the data line reset stage may be performed before the data writing stage. Accordingly, the first terminal and the second terminal of the data line reset module 102 are conducted, and the low voltage signal VD provided by the data line reset signal terminal D may be transmitted to the data line S to reset the data line S. Accordingly, the data line reset signal provided by the data line reset signal terminal D may be used to clear the residual data voltage value on the data line S of a previous frame before a next frame starts, so as to reset the data line S. As such, the data voltage signal Vdata provided on the data line S of the next frame may avoid the interference by the residual value of the previous frame as much as possible. Then, in the data writing stage of the next frame, the data voltage signal Vdata on the data line S may be fast and fully written into the driving transistor DT through the data writing module 101. Accordingly, the problem of insufficient threshold compensation of the driving transistor DT in the pixel circuit 10 may be addressed, and display uniformity and display quality may be improved. Furthermore, the increase of the time of the data writing stage may not be needed, and power consumption may be reduced.

In one embodiment, the low voltage signal VD provided by the data line reset signal terminal D is smaller than Vmin, and Vmin is a value of the data voltage signal Vdata-B required by the blue light emitting element at the highest brightness. The plurality of light emitting elements 20 in the display panel 000 may include blue light emitting elements, red light emitting elements and green light emitting elements. When the value range of the data voltage signal transmitted on the data line S is defined as Vgsp-Vgmp, the smallest data voltage signal Vdata-min among different light emitting elements 20 corresponding to the display panel 000 at the highest brightness may be the value of the data voltage signal Vdata-B of the blue light emitting element. That is, Vmin is Vdata-min, which is the value of the data voltage signal Vdata-B required by the blue light emitting element at the highest brightness. When the value range of the data voltage signal transmitted on the data line S is defined as Vgsp-Vgmp, the relationship between the maximum value Vgmp, the minimum value Vgsp and Vmin of the data voltage signal transmitted on the data line S may be Vgsp<Vmin<Vgmp.

In one embodiment, the low voltage signal VD provided by the data line reset signal terminal D is at least less than Vmin, such that the reset effect of the data line reset module 102 on the data line S may be improved. For example, when the positive power supply voltage value Vpvdd that provides the positive power signal for the pixel circuit 10 in the display panel 000 is about 3.3V, the low voltage signal VD provided by the reset signal terminal D of the data line may be about 1V. By setting the low voltage signal VD at least smaller than the value of the data voltage signal Vdata-B required by the blue light emitting element at the highest brightness, the reset effect of the data line S before the data writing stage may be improved, and the display quality may be improved.

Figure 3:
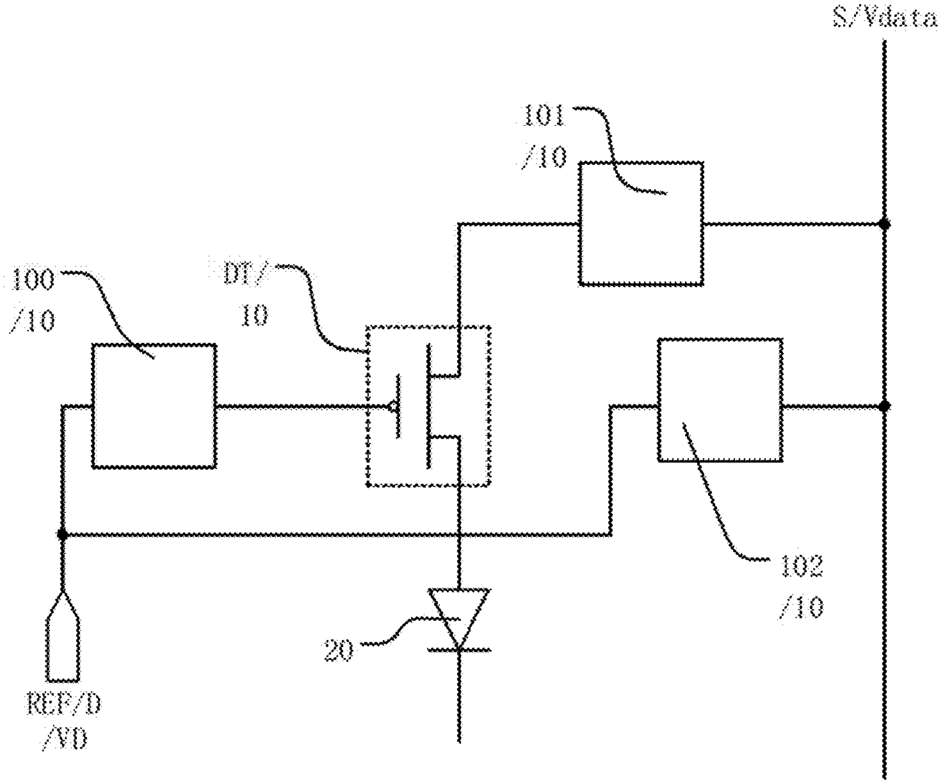
FIG. 3 illustrates a schematic diagram of another electrical connection structure of a sub-pixel in FIG. 1, consistent with the disclosed embodiments of the present disclosure.

FIG. 3 illustrates a schematic diagram of another electrical connection structure of a sub-pixel in FIG. 1. Referring to FIGS. 1 and 3, in one embodiment, the pixel circuit 10 may also include a reset module 100. A first terminal of the reset module 100 is electrically connected to a reference voltage signal terminal REF. A second terminal of the reset module 100 is electrically connected to the gate of the driving transistor DT. The data line reset signal terminal D is electrically connected to the reference voltage signal terminal REF.

In one embodiment, in each sub-pixel P of the display panel 000, the pixel circuit 10 also includes a reset module 100. The first terminal of the reset module 100 is electrically connected to the reference voltage signal terminal REF, and the second terminal of the reset module 100 is electrically connected to the gate of the driving transistor DT. The reset reference signal provided by the reference voltage signal terminal REF may be transmitted to the gate of the driving transistor DT. The reset reference signal provided by the reference voltage signal terminal REF may be a low-level signal. The low-level potential of the reset reference signal may be used to reset the gate of the driving transistor DT, and the conduction of the driving transistor DT after completing the reset operation may be achieved.

In one embodiment, the reset signal terminal D of the data line is electrically connected to the reference voltage signal terminal REF. The reset reference signal provided by the reference voltage signal terminal REF for resetting the gate of the driving transistor DT may be a low-level signal. The low-voltage signal VD provided by the reset signal terminal D of the data line may directly multiplex the reference voltage signal terminal REF included in the pixel circuit 10 in the display panel 000. That is, the data line reset signal terminal D and the reference voltage signal terminal REF of the pixel circuit 10 may be shared. Accordingly, each pixel circuit 10 of the display panel 000 may save one signal terminal, and the quantity of signal terminals in the display panel 000 may be reduced. In addition, when the data line reset signal terminal D and the reference voltage signal terminal REF of the pixel circuit 10 are shared, the data line reset signal terminal D and the reference voltage signal terminal REF may be connected to a same reference voltage signal line. As such, the quantity of signal lines in the display panel 000 may be reduced, and the layout space may be saved.

Figure 4:
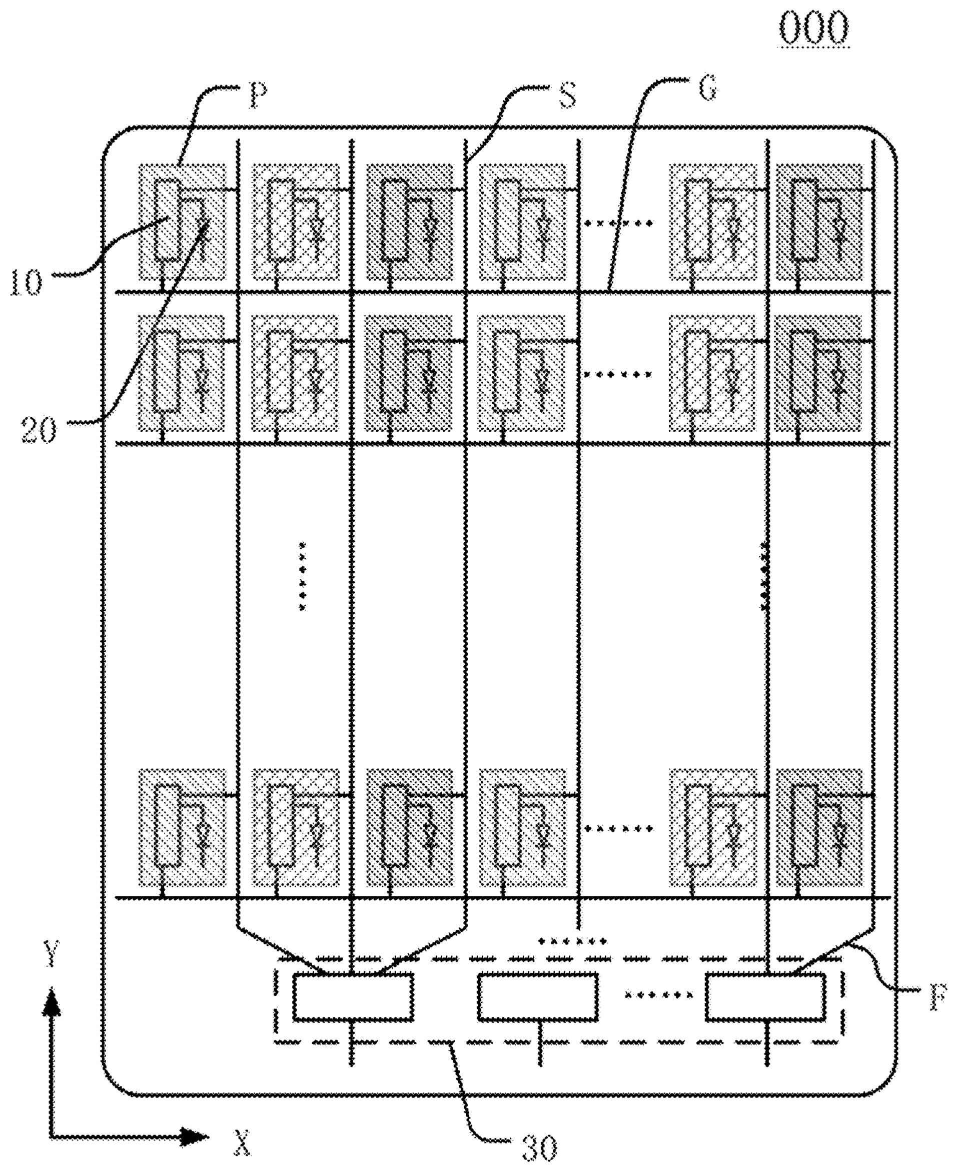
FIG. 4 illustrates a schematic diagram of another plan structure of a display panel consistent with the disclosed embodiments of the present disclosure.
Figure 5:
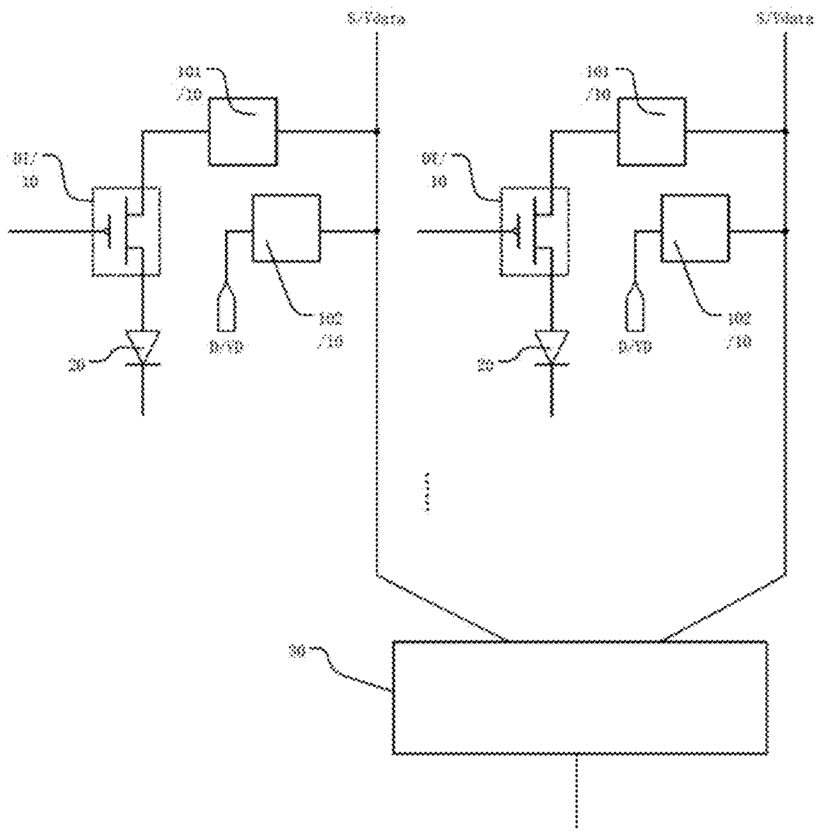
FIG. 5 illustrates a schematic diagram of an electrical connection structure of a plurality of sub-pixels and a multiplexing circuit in FIG. 4, consistent with the disclosed embodiments of the present disclosure.

FIG. 4 illustrates a schematic diagram of another plan structure of a display panel consistent with the disclosed embodiments of the present disclosure. FIG. 5 illustrates a schematic diagram of an electrical connection structure of a plurality of sub-pixels and a multiplexing circuit in FIG. 4.

Referring to FIGS. 4 and 5, in one embodiment, the display panel 000 includes a multiplexing circuit 30.

The first terminal of the data writing module 101 is electrically connected to the first electrode of the driving transistor DT. The second terminal of the data writing module 101 is electrically connected to one terminal of the data line S, and the other terminal of the data line S is electrically connected to the output terminal of the multiplexing circuit 30. In the data writing stage, the conduction period of the multiplexing circuit 30 may overlap with the conduction period of the data writing module 101.

The narrow frame design of existing display panels is mainly reflected in a narrow upper frame, a narrow left frame and a narrow right frame, while the narrow frame design of a lower frame may still be difficult. A main reason is that, as resolution requirements for display panels become higher and higher, a quantity of output pins of the driver chips may increase accordingly, resulting in an increase in a quantity of corresponding traces. The increase in the quantity of traces may make it difficult to reduce the fan-shaped area (Fan-out) used to lay out connecting lines (such as data lines) between the driver chip (or flexible circuit board) and the panel. As a result, the lower frame of the display panel may not achieve a narrow frame design like the upper frame and the left and right frames, affecting the appearance of the display panel.

To address above-described problems, in one embodiment, a multiplexing circuit 30 is provided in a non-display area NA of the display panel 000. The multiplexing circuit 30 may be a demultiplexer (Demux). Optionally, the sub-pixels P may be located in the display area AA of the display panel 000, and the multiplexing circuit 30 may be located in the non-display area NA of the display panel 000. The first terminal of the data writing module 101 of the pixel circuit 10 may be electrically connected to the first electrode of the driving transistor DT, and the second terminal of the data writing module 101 may be electrically connected to one terminal of the data line S. The other terminal of the data line S may be electrically connected to the output terminal of the multiplexing circuit 30. Optionally, the other terminal of the data line S may be electrically connected to the output terminal of the multiplexing circuit 30 through the fan-out trace F. Through the arrangement of the multiplexing circuit 30, the second terminal of the data writing module 101 may be electrically connected to one terminal of the data line S. The other terminal of the data line S may be electrically connected to the output terminal of the multiplexing circuit 30. Accordingly, while reducing the quantity of fan-out traces in the fan-shaped area (Fan-out) (traces used for electrically connecting the data line S of the display area AA to the driver chip or flexible circuit board that may be subsequently bound to the display panel 000), writing of data voltage signals may be completed. As such, the space of the non-display area NA occupied by the fan-out traces may be reduced. Accordingly, the widths of the non-display area NA in the first direction X and the second direction Y may be reduced overall, and narrow design of the lower frame of the display panel 000 may be achieved.

It may be understood that the present disclosure does not elaborate on the connection structure of the multiplexing circuit 30. In specific implementation, the connection structure of the electrical connection between the multiplexing circuit 30, the data line S, and the subsequently bound driver chip or the flexible circuit board may be understood with reference to connection methods in subsequent embodiments. FIG. 4 only illustrates the multiplexing circuit 30 with a block diagram.

However, after the display panel uses the Demux structure, especially under the conditions of high refresh frequency and high resolution, the data writing time that may be allocated to each row of sub-pixels may be short. In existing technologies, when the data voltage signal is written, the Demux circuit may be first turned on, and the data voltage signal may be first written on the data line of the display area through the Demux circuit. The data writing module in the pixel circuit may be turned on after. After the data writing module is turned on, the data voltage signal that has been written on the data line may be written into the gate of the driving transistor. Although this method may reduce power consumption, turning on of the Demux circuit and conduction of the data writing module need to be completed within the scanning time of one row. Under conditions of high refresh frequency and high resolution, the scanning time of each row of sub-pixels may be short, and the data writing time that may be allocated to each row of sub-pixels may be also short. Accordingly, the data writing time may be insufficient, and the threshold compensation of the driving transistor may be insufficient. As such, the display uniformity may be affected, resulting in poor display effects. Increasing the time for data writing may improve display effects, but may in turn increase the power consumption of the display panel.

To solve above-described problems, in one embodiment, in the data writing stage, the conduction time period of the multiplexing circuit 30 overlaps with the conduction time period of the data writing module 101. That is, while the first terminal and the second terminal of the data writing module 101 are conducted in the data writing stage, the multiplexing circuit 30 is also turned on. When the display panel 000 drives display, while the data voltage signal is transmitted to the data line S through the multiplexing circuit 30, the data writing module 101 is also turned on, and the data voltage signal transmitted on the data line S may be synchronously written into the driving transistor DT. By configuring the multiplexing circuit 30 and directly writing the data voltage signal to the gate of the driving transistor DT, a narrow frame design may be realized, and long data writing time may be achieved. Accordingly, the threshold compensation of the driving transistor DT may be sufficient, good display uniformity may be obtained, and display quality may be improved.

Figure 6:
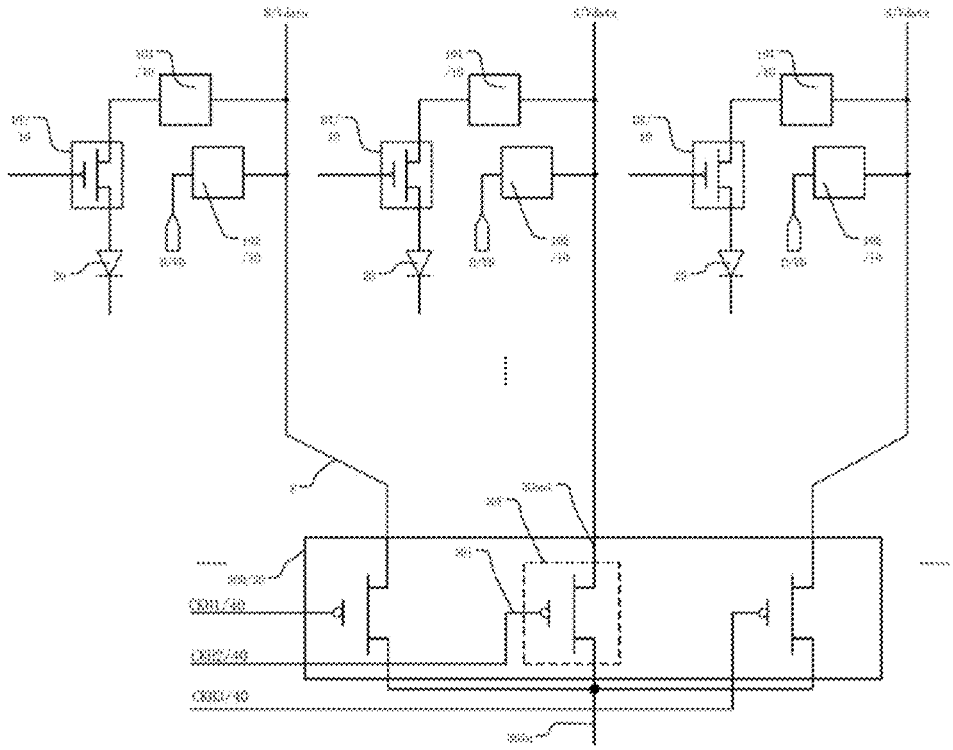
FIG. 6 illustrates a schematic diagram of another electrical connection structure of a plurality of sub-pixels and a multiplexing circuit in FIG. 4, consistent with the disclosed embodiments of the present disclosure.

FIG. 6 illustrates a schematic diagram of another electrical connection structure of a plurality of sub-pixels and a multiplexing circuit in FIG. 4. Referring to FIGS. 4-6, in one embodiment, the multiplexing circuit 30 includes a plurality of multiplexing units 300. Each multiplexing unit 300 includes a plurality of control terminals 301, a signal input terminal 30 in and a plurality of signal output terminals 30out. The control terminal 301 is connected to control signals (CKH1, CKH2, CKH3 as shown in FIG. 6). The signal input terminal 30 in receives the data voltage signal Vdata, and the plurality of signal output terminals 30out are connected to different data lines S respectively. In the multiplexing unit 300, the ratio of the quantities of signal input terminals 30 in and signal output terminals 30out is 1:N, where N is an integer and N≥2.

Optionally, the multiplexing unit 300 may include a plurality of switching transistors 30T. Gates of the switching transistors 30T are connected to the control terminals 301, and the first electrodes of the switching transistors 30T are connected to the signal input terminals 30*in*. The second electrodes of the switching transistors 30T are connected to the signal output terminals 30out. The signal input terminals 30 in are connected to a part of conductive pads (not shown in FIG. 6) in the bonding area through the fan-out trace F in the fan-out area. The output terminals 30out are connected to the data lines S of the display area AA.

In FIG. 6, the multiplexing circuit 30 adopts 1:3 demux as an example. Accordingly, the whole multiplexing circuit 30 may include three control terminals 301 (CKH1, CKH2, and CKH3 as shown in FIG. 6). In this configuration, three clock control signal lines 40 may extend from only one terminal of the multiplexing circuit 30 and connected to the three control terminals 301 of the multiplexing circuit 30 respectively (not shown in FIG. 6). Three clock control signal lines 40 may extend from at least one terminal of the multiplexing circuit 30 and connected to the three control terminals 301 of the multiplexing circuit 30 respectively. Accordingly, the clock control signals provided by a part of conductive pads in the bonding area may be transmitted from at least one terminal of the multiplexing circuit 30 to the multiplexing circuit. As such, the data voltage signal may be transmitted through the multiplexing circuit 30 to reduce the width of the non-display area NA.

In one embodiment, the multiplexing circuit 30 includes a plurality of control terminals 301. The plurality of conductive pads included in the bonding area may be connected to the plurality of control terminals 301 provided in the multiplexing circuit 30 through the plurality of clock control signal lines 40 in one-to-one correspondence. The clock control signal may be provided to the multiplexing circuit 30 through the clock control signal line 40. The clock control signal transmitted on the clock control signal line 40 may be a pulse signal, and may be used to control the conduction and disconnection of the multiplexing circuit 30.

When the display panel 000 displays different frames, the residual voltage signal on the data line S after a previous frame is completed may affect the signal transmission of the data line S in a next frame. Accordingly, crosstalk between display data in the panel structure may appear, and display quality may be affected. In existing technologies, when the display panel includes a multiplexing circuit, the clock control signal may be provided to the multiplexing circuit 30 through the clock control signal line 40 before the data voltage signal is written. In this way, the switching transistor 30T in the multiplexing circuit 30 may be turned on first, to provide a low-level reset signal to the data line S to perform a data reset operation on the data line. However, this design method requires the reset operation to be performed by switching the clock control signal before the data voltage signal is written. Accordingly, the switching frequency of the clock control signal may be increased, resulting in increased power consumption.

In one embodiment, the pixel circuit 10 includes a data line reset module 102. By setting the data line reset module 102, the data line reset module 102 may be directly used to reset the data line S. As such, operation of turning on the multiplexing circuit 30 before the data writing stage to transmit the reset signal to reset the data line S may be simplified. That is, the clock control signal of the multiplexing circuit 30 does not need to be switched before the data writing stage, just waiting for the multiplexing circuit 30 to start transmitting the data voltage signal when the data writing module 101 is turned on in the data writing stage. In this way, the conductive pad in the bonding area may decrease one time of transmitting the data voltage signal used for reset, reducing the quantity of data voltage signal transitions. Accordingly, the driving power consumption of the multiplexing circuit 30 may be reduced, and the power consumption of the whole display panel 000 may be reduced. In the data writing stage, the conduction period of the multiplexing circuit 30 may be set to overlap with the conduction period of the data writing module 101, such that the data writing time may be sufficient. As such, narrow frame design may be achieved, and display quality may be improved.

Figure 7:
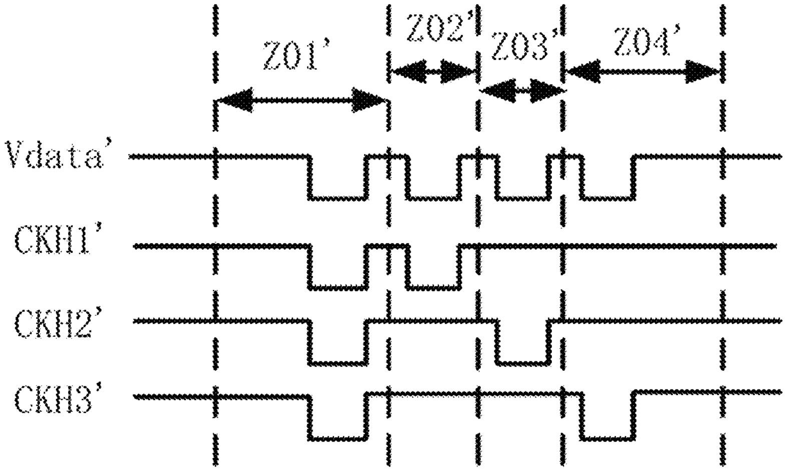
FIG. 7 illustrates a timing diagram of each clock control signal required for a data voltage signal and a multiplexing circuit.

FIG. 7 illustrates a timing diagram of each clock control signal required for a data voltage signal and a multiplexing circuit in existing technology. Stage Z01'*in* FIG. 7 may be understood as the data line reset stage. In stage Z01', clock control signals CKH1', CKH2', and CKH3' provided by the clock control signal line control each of the switching transistors in the multiplexing circuit to turn on. The data voltage signal Vdata' used for reset may be transmitted to the data line through the multiplexing circuit to reset the data line. The display panel then enters the data writing stage, such as stages Z02', Z03', and Z04' in FIG. 7. The clock control signals CKH1', CKH2', and CKH3' provided by the clock control signal line sequentially control the conduction of different switching transistors in the multiplexing circuit, and write data voltage signals into different data lines respectively.

Figure 8:
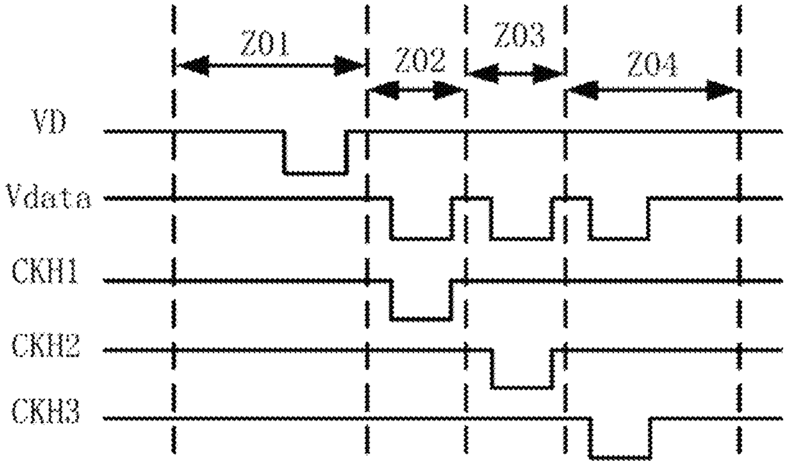
FIG. 8 illustrates a timing diagram of each clock control signal required for a data voltage signal, a data line reset signal and a multiplexing circuit, consistent with the disclosed embodiments of the present disclosure.

FIG. 8 illustrates a timing diagram of each clock control signal required for a data voltage signal, a data line reset signal and a multiplexing circuit, consistent with the disclosed embodiments of the present disclosure. Stage Z01 in FIG. 8 may be understood as the data line reset stage. In stage Z01, clock control signals CKH1, CKH2, and CKH3 provided by the clock control signal line 40 do not need to control the switching transistor 30T in the multiplexing circuit 30 to turn on. That is, clock control signals CKH1, CKH2, and CKH3 do not need to perform signal switching and only need to wait. The data reset module 102 is turned on, the data line reset signal VD is provided to the data line reset signal terminal D, and the data line reset signal VD is transmitted to the data line S to reset the data line. The display panel then enters the data writing stage. The multiplexing circuit 30 sequentially controls the different switching transistors 30T in the multiplexing circuit 30 to turn on, through the clock control signals CKH1, CKH2, and CKH3 provided by the clock control signal line 40. Simultaneously, data writing module 101 is also turned on. In this way, the data writing time may be increased, the operation of writing the data voltage signal Vdata to different data lines S may be completed. Compared with FIG. 7, FIG. 8 may reduce one time of inputting operation of the data voltage signal in the stage Z01 and switching operation of the clock control signals CKH1, CKH2, and CKH3 in the stage Z01. Accordingly, the conductive pad in the bonding area may reduce one time of transmitting the data voltage signal used for reset and may reduce one time of transmitting the clock control signal. Accordingly, the quantity of transitions of the data voltage signal and the clock control signal may be reduced, the driving power consumption of the multiplexing circuit 30 may be reduced, and the power consumption of the whole display panel 000 may be reduced.

It may be understood that FIG. 8 only takes the switching transistor 30T of the multiplexing circuit 30 as a P-type transistor as an example for illustration. In specific implementation, the switching transistor 30T of the multiplexing circuit 30 may be an N-type transistor. The present disclosure does not limit a specific type of the switching transistor 30T.

Figure 9:
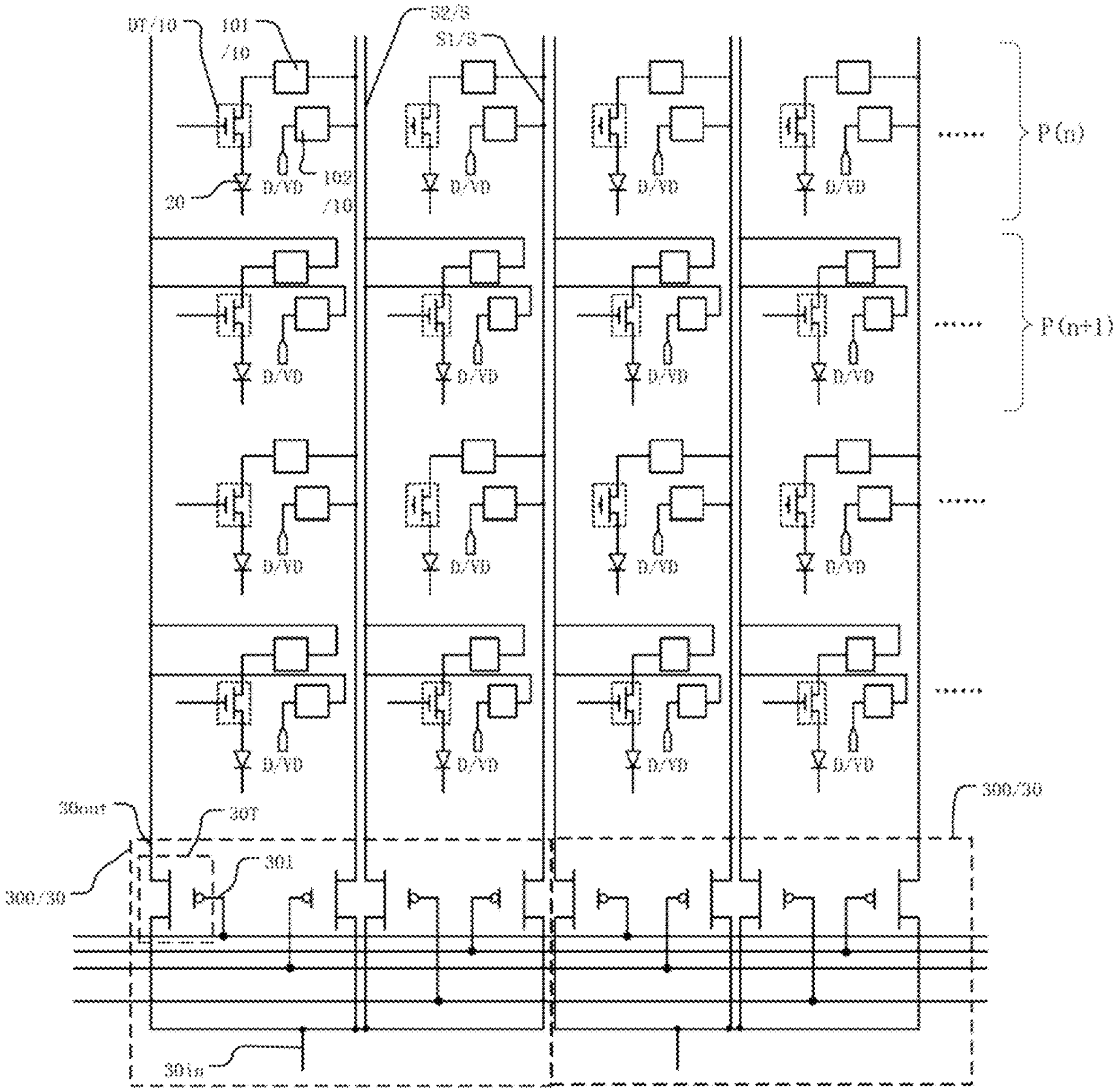
FIG. 9 illustrates a schematic diagram of another electrical connection structure of a plurality of sub-pixels and a multiplexing circuit, consistent with the disclosed embodiments of the present disclosure.

FIG. 9 illustrates a schematic diagram of another electrical connection structure of a plurality of sub-pixels and a multiplexing circuit, consistent with the disclosed embodiments of the present disclosure. Referring to FIGS. 2 and 9, in one embodiment, the second terminals of the data writing modules 101 of the sub-pixels P in a same column may be connected to two different data lines S. The two different data lines S corresponding to the sub-pixels P in a same column include a first data line S1 and a second data line S2.

Among the plurality of sub-pixels in a same column, the second terminal of the data writing module 101 of an n-th row sub-pixel P (n) is connected to the first data line S1, and a second terminal of the data writing module 101 of an (n+1)-th row sub-pixel P (n+1) is connected to the second data line S2, where n is a positive integer.

In one embodiment, the sub-pixels P in a same column in the display panel 000 may be connected to two data lines S, namely the first data line S1 and the second data line S2. By setting the multiplexing circuit 30, data voltage signals may be simultaneously written to the pixel circuits 10 of a same column of sub-pixels P through the first data line S1 and the second data line S2. Specifically, the second terminals of the data writing modules 101 of the sub-pixels P in a same column may be connected to two different data lines S, namely the first data line S1 and the second data line S2. Among a plurality of sub-pixels in a same column, the second terminal of the data writing module 101 of the n-th row sub-pixel P (n) is connected to the first data line S1, and the second terminal of the data writing module 101 of the (n+1)-th row sub-pixel P (n+1) is connected to the second data line S2. As such, when the multiplexing circuit 30 is turned on, the data writing module 101 is turned on, and the data voltage signal transmitted on the first data line S1 may be directly written into the pixel circuit 10 of the n-th row sub-pixel P (n). The data voltage signal transmitted on the second data line S2 may be directly written into the pixel circuit 10 of the (n+1)-th row sub-pixel P (n+1). Accordingly, the sub-pixel P in a current sub-pixel row has sufficient data writing time. Especially, even in a high-frequency driving mode with a high refresh frequency, the sub-pixel P may have sufficient charging time for data writing. As a result, the data voltage signal may be fully written, and the display quality of the display panel 000 in a high-frequency driving mode may be improved.

It may be understood that FIG. 9 only illustrates an electrical connection structure of a plurality of sub-pixels and a multiplexing circuit. In specific implementation, the electrical connection methods between the sub-pixels and the multiplexing circuit may include but are not limited to the method described above, and may include other connection methods, provided that the sub-pixels P in a same column are connected to two data lines S. Details will not be described here.

Figure 10:
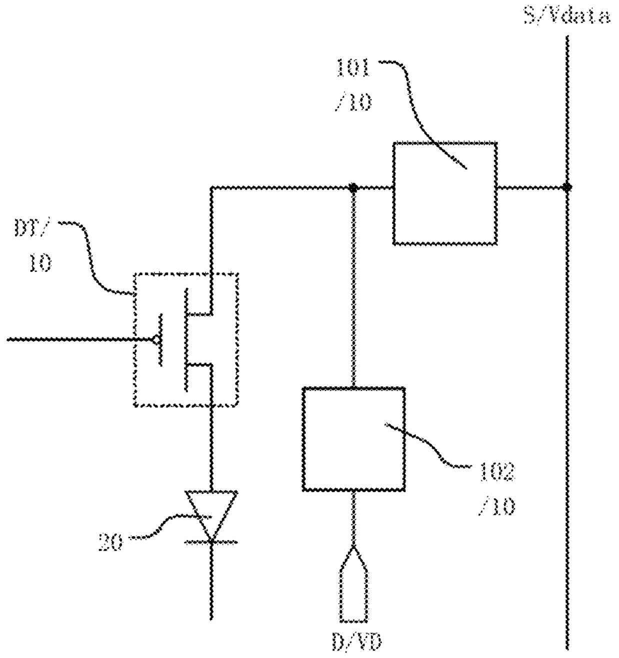
FIG. 10 illustrates a schematic diagram of an electrical connection structure of a sub-pixel in FIG. 4, consistent with the disclosed embodiments of the present disclosure.
Figure 11:
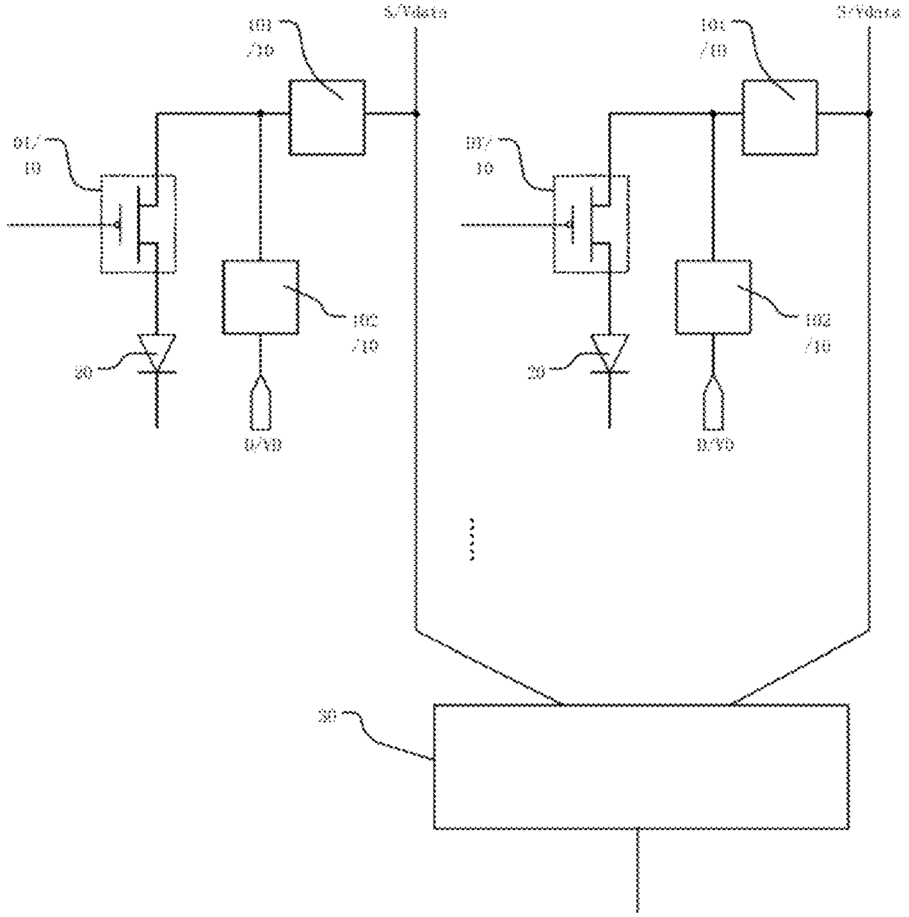
FIG. 11 illustrates a schematic diagram of another electrical connection structure between a plurality of sub-pixels and a multiplexing circuit in FIG. 4, consistent with the disclosed embodiments of the present disclosure.

FIG. 10 illustrates a schematic diagram of an electrical connection structure of a sub-pixel in FIG. 4. FIG. 11 illustrates a schematic diagram of another electrical connection structure between a plurality of sub-pixels and a multiplexing circuit in FIG. 4. Referring to FIGS. 4, 10, and 11, in one embodiment, the first terminal of the data line reset module 102 is electrically connected to the first electrode of the driving transistor DT, and the first terminal of the data line reset module 102 is electrically connected to the first terminal of the data writing module 101. In the data line reset stage, the data writing module 101 is turned on.

In one embodiment, in the pixel circuit 10 included in the sub-pixel P, the first electrode of the driving transistor DT is electrically connected to the first terminal of the data writing module 101, and the first terminal of the data line reset module 102 is electrically connected to the first electrode of the driving transistor DT. That is, the first terminal of the data line reset module 102 is electrically connected to the first terminal of the data writing module 101, and the second terminal of the data line reset module 102 is electrically connected to the data line reset signal terminal D. The second terminal of the data writing module 101 is connected to one terminal of the data line S, and the other terminal of the data line S is connected to the signal output terminal 30out of the multiplexing circuit 30. As such, a conductive path may be formed between the multiplexing circuit 30, the data writing module 101, the data line reset module 102 and the data line reset signal terminal D.

In one embodiment, in the data line reset stage, the data writing module 101 is turned on, that is, the data writing module 101 and the data line reset module 102 each are turned on in the data line reset stage. Resetting the data line S only needs to control each of the data writing module 101 and the data line reset module 102 to be turned on. The data line reset signal provided by the data line reset signal terminal D may be sequentially transmitted to the data line S through the data line reset module 102 and the data writing module 101, thereby realizing the reset operation of the data line S. The operation of transmitting the reset signal of the data line to the data line S through the multiplexing circuit 30 may be reduced one time. Accordingly, the quantity of data voltage signal transitions may be reduced, and panel power consumption may be reduced. Moreover, since the first terminal of the data line reset module 102 is electrically connected to the first terminal of the data writing module 101, connection nodes between the first terminal of the data line reset module 102 and the data line S may also be reduced. As such, the quantity of nodes in the pixel circuit 10 may be reduced, and the layout space of the panel may be saved.

Figure 12:
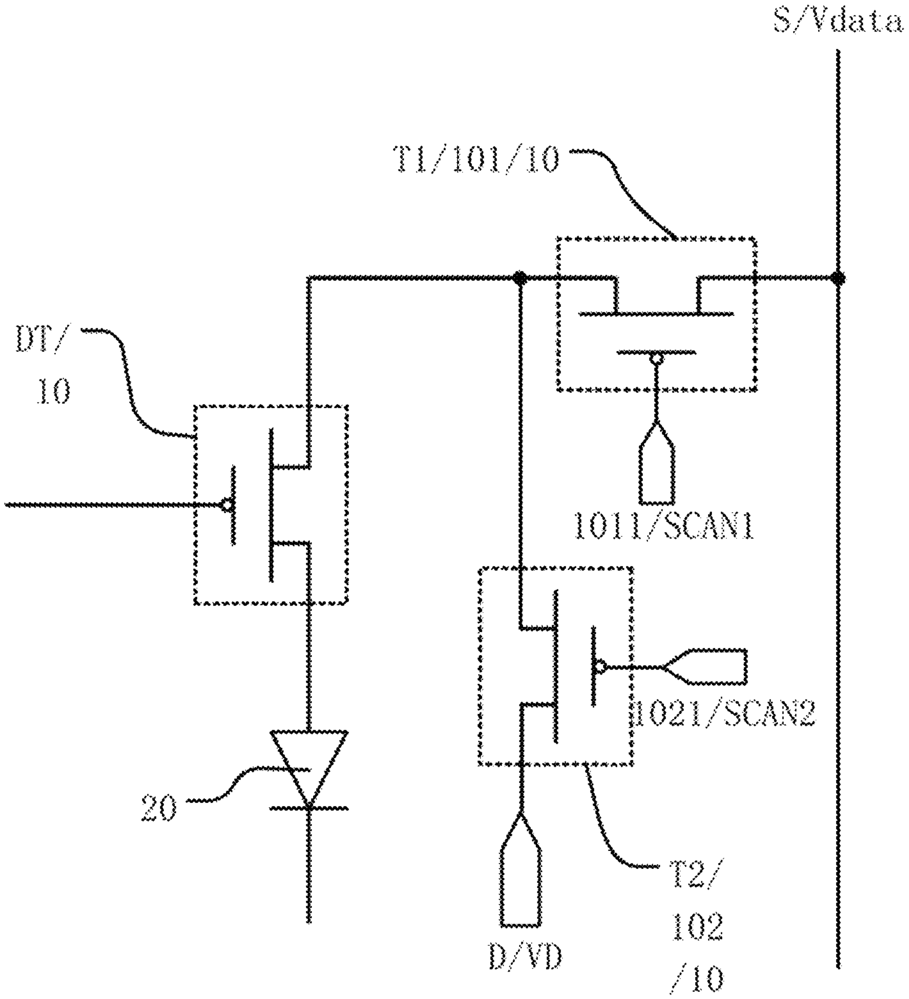
FIG. 12 illustrates a schematic diagram of another electrical connection structure of a sub-pixel in FIG. 4, consistent with the disclosed embodiments of the present disclosure.
Figure 13:
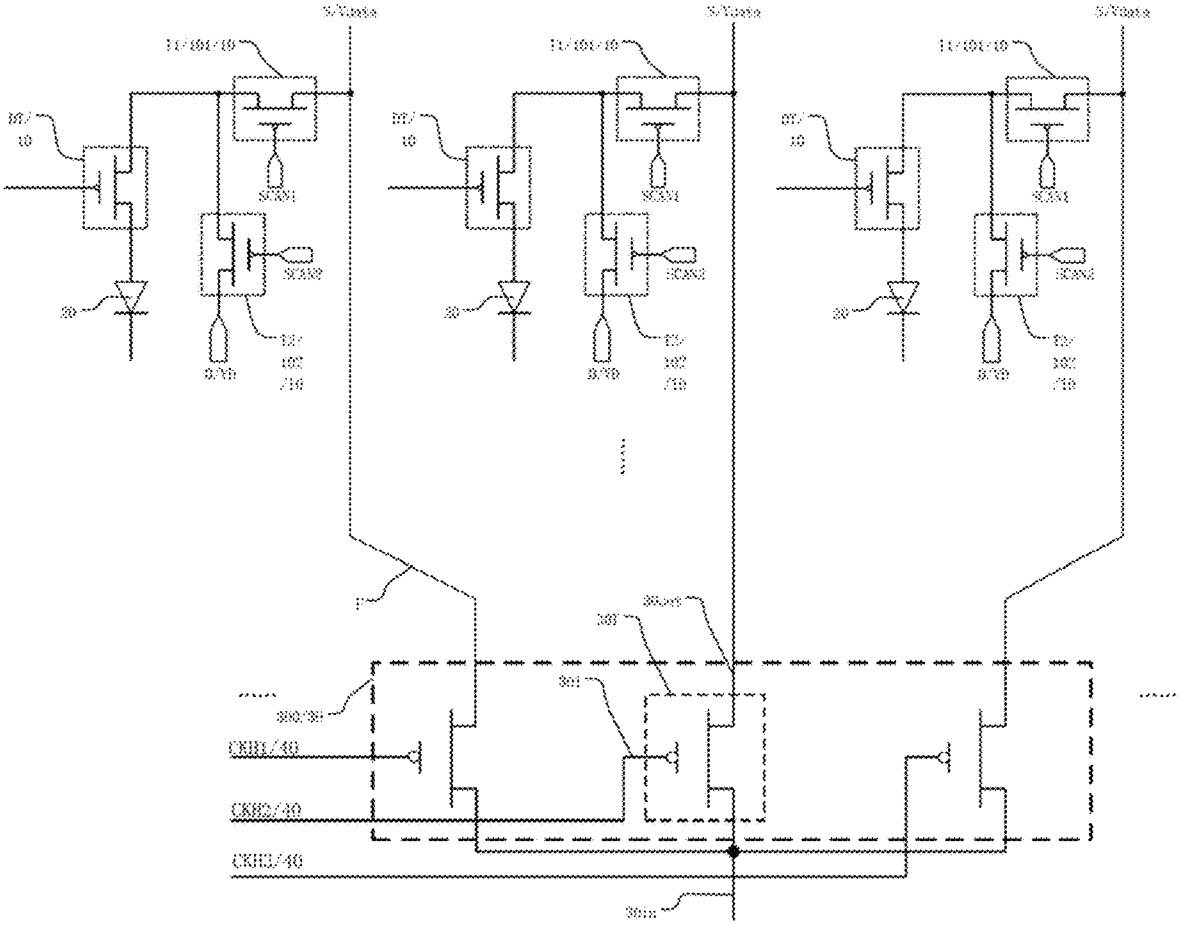
FIG. 13 illustrates a schematic diagram of another electrical connection structure between a plurality of sub-pixels and a multiplexing circuit in FIG. 4, consistent with the disclosed embodiments of the present disclosure.
Figure 14:
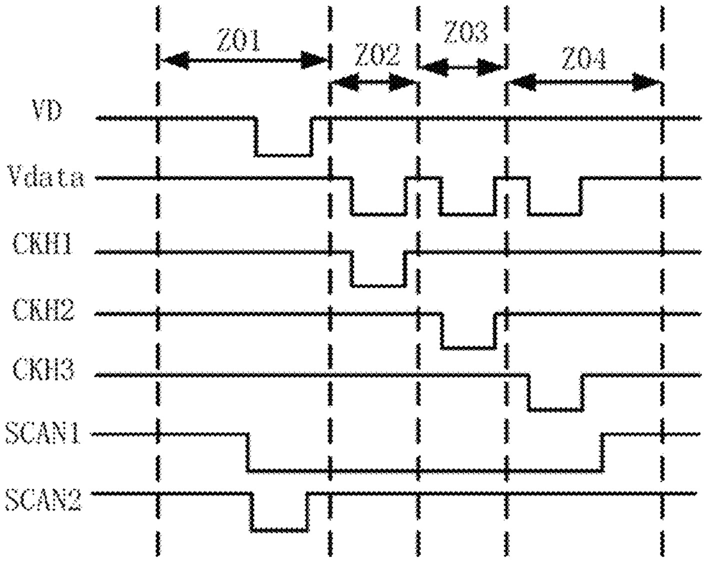
FIG. 14 illustrates a timing diagram of each clock control signal required by a data voltage signal, a data line reset signal, each scan signal and a multiplexing circuit in FIG. 13, consistent with the disclosed embodiments of the present disclosure.

FIG. 12 illustrates a schematic diagram of another electrical connection structure of a sub-pixel in FIG. 4. FIG. 13 illustrates a schematic diagram of another electrical connection structure between a plurality of sub-pixels and a multiplexing circuit in FIG. 4. FIG. 14 illustrates a timing diagram of each clock control signal required by a data voltage signal, a data line reset signal, each scan signal and a multiplexing circuit in FIG. 13. Referring FIGS. 4, 12, 13, and 14, in one embodiment, the data writing module 101 includes a first transistor T1. A gate of the first transistor T1 is electrically connected to the first scan signal terminal 1011, a first electrode of the first transistor T1 is electrically connected to the first electrode of the driving transistor DT, and a second electrode of the first transistor T1 is electrically connected to the data line S.

The data line reset module 102 includes a second transistor T2. A gate of the second transistor T2 is electrically connected to a second scan signal terminal 1021, a first electrode of the second transistor T2 is electrically connected to the first electrode of the driving transistor DT, and a second electrode of the second transistor T2 is electrically connected to the data line reset signal terminal D.

In the data line reset stage, the first scan signal terminal 1011 provides a first scan signal SCAN1 to control the first transistor T1 to turn on, and the second scan signal terminal 1021 provides a second scan signal SCAN2 to control the second transistor T2 to turn on. The data line reset signal VD may be transmitted to the data line S.

In the data writing stage, the first scan signal terminal 1011 provides the first scan signal SCAN1 to control the first transistor T1 to turn on, and the second scan signal terminal 1021 provides the second scan signal SCAN2 to control the second transistor T2 to turn off. The multiplexing circuit 30 is turned on. The data voltage signal Vdata of the data line S may be transmitted to the driving transistor DT.

In one embodiment, the data writing module 101 included in the pixel circuit 10 may include a first transistor T1, and the data line reset module 102 may include a second transistor T2. The gate of the first transistor T1 is electrically connected to the first scan signal SCAN1 provided by the first scan signal terminal 1011 to control the conduction and disconnection of the first transistor T1. The gate of the second transistor T2 is electrically connected to the second scan signal SCAN2 provided by the second scan signal terminal 1021 to control the conduction and disconnection of the second transistor T2. In FIGS. 12 and 13, the first transistor T1 and the second transistor T2 each are P-type transistors as an example for illustration. That is, when the first scan signal SCAN1 provided by the first scan signal terminal 1011 is a low potential signal, the first transistor T1 is turned on. When the first scan signal SCAN1 provided by the first scan signal terminal 1011 is a high potential signal, the first transistor T1 is turned off. When the second scan signal SCAN2 provided by the second scan signal terminal 1021 is a low potential signal, the second transistor T2 is turned on. When the second scan signal SCAN2 provided by the second scan signal terminal 1021 is a high potential signal, the second transistor T2 is turned off.

In one embodiment, the data line reset stage is performed before the data writing stage. In the data line reset stage, such as the stage Z01 in FIG. 14, the first scan signal terminal 1011 provides the first scan signal SCAN1 to control the first transistor T1 to turn on. The second scan signal terminal 1021 provides the second scan signal SCAN2 to control the second transistor T2 to turn on. The data line reset signal VD provided by the data line reset signal terminal D may be transmitted to the data line S to perform a reset operation on the data line S. Then the display panel enters the data writing stage. In the data writing stage, such as the stage Z02, stage Z03, and stage Z04 in FIG. 14, the first scan signal terminal 1011 may provide the first scan signal SCAN1 to control the first transistor T1 to turn on. The second scan signal terminal 1021 may provide the second scan signal SCAN2 to control the second transistor T2 to turn off. The multiplexing circuit 30 may be turned on. The data voltage signal Vdata of the data line S may be transmitted to the driving transistor DT, and the data voltage signal Vdata may be written into the gate of the driving transistor DT.

In one embodiment, when the pixel circuit 10 is in operation, the first scanning signal SCAN1 may be provided through the first scan signal terminal 1011 and the second scanning signal SCAN2 may be provided through the second scanning signal terminal 1021. The remaining data voltage value on the data line S of a previous frame may be cleared before a next frame starts. The data line reset signal VD provided by the data line reset signal terminal D may be transmitted to the data line S to reset the data line S. Accordingly, the data voltage signal Vdata provided on the data line S of the next frame may avoid the interference by the residual value of the previous frame as much as possible. In the data writing stage of the next frame, the data voltage signal Vdata on the data line S may be fast and fully written into the driving transistor DT through the data writing module 101. As such, the problem of insufficient threshold compensation of the driving transistor DT in the pixel circuit 10 may be addressed, the display uniformity may be improved, and display quality may thus be improved. In addition, the increase of the time of the data writing stage may not be needed, the quantity of switching times of the clock control signal of the multiplexing circuit 30 may be reduced, and power consumption may thus be reduced.

Figure 15:
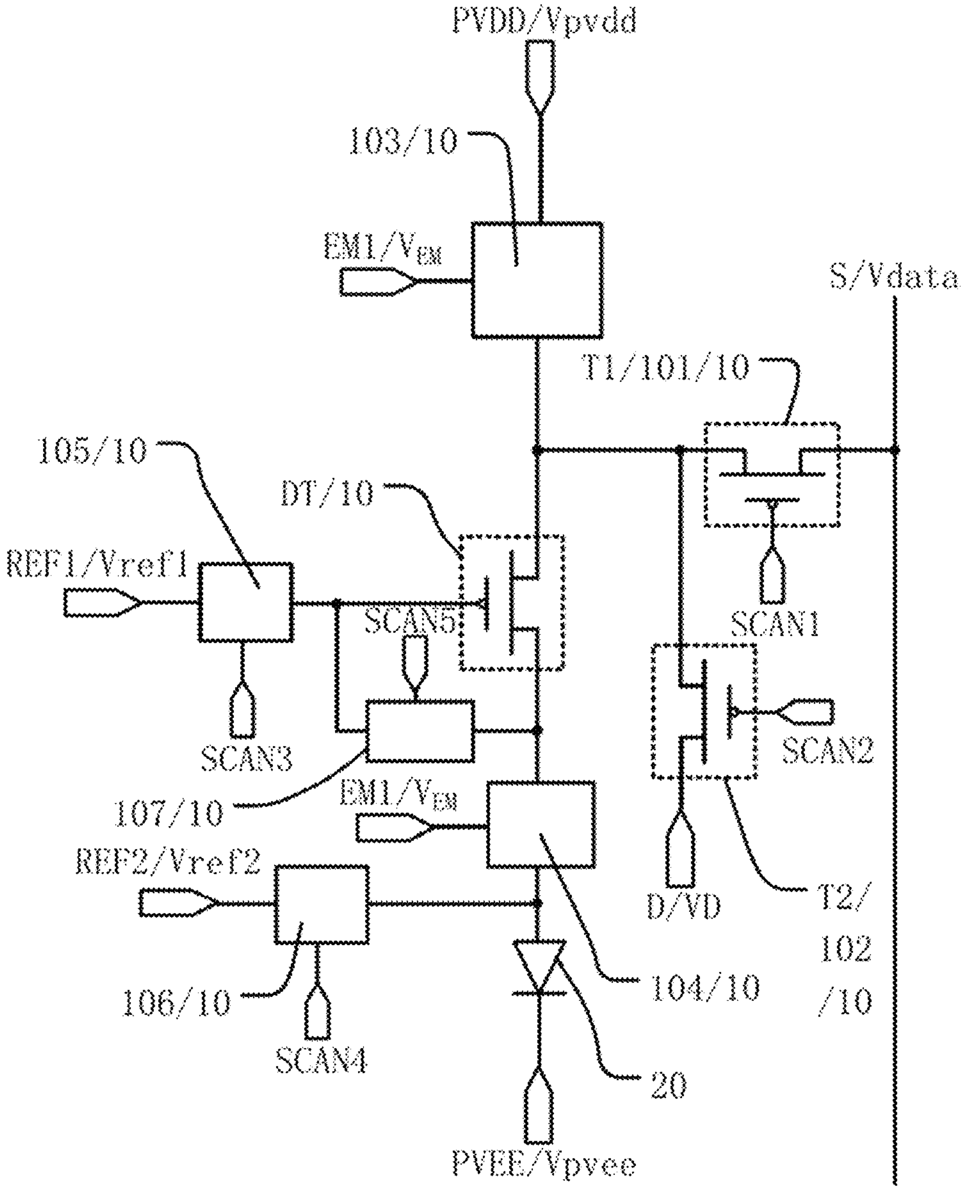
FIG. 15 illustrates a schematic diagram of another electrical connection structure of a sub-pixel in FIG. 4, consistent with the disclosed embodiments of the present disclosure.

FIG. 15 illustrates a schematic diagram of another electrical connection structure of a sub-pixel in FIG. 4. Referring to FIGS. 4 and 15, in one embodiment, the pixel circuit 10 also includes a first light emitting control module 103, a second light emitting control module 104, a first reset module 105, a second reset module 106, and a threshold compensation module 107.

A first terminal of the first light emitting control module 103 is electrically connected to a first power signal terminal PVDD, and a second terminal of the first light emitting control module 103 is electrically connected to the first electrode of the driving transistor DT.

A first terminal of the second light emitting control module 104 is electrically connected to the second electrode of the driving transistor DT, and a second terminal of the second light emitting control module 104 is electrically connected to an anode of the light emitting element 20. A cathode of the light emitting element 20 is connected to a second power signal terminal PVEE.

A first terminal of the first reset module 105 is electrically connected to a first reference voltage signal terminal REF1, and a second terminal of the first reset module 105 is electrically connected to the gate of the driving transistor DT.

A first terminal of the second reset module 106 is electrically connected to a second reference voltage signal terminal REF2, and a second terminal of the second reset module 106 is electrically connected to the anode of the light emitting element 20.

The threshold compensation module 107 is electrically connected between the gate of the driving transistor DT and the second electrode of the driving transistor DT.

Optionally, the pixel circuit 10 also includes a memory module 108. The memory module 108 is electrically connected between the first power signal terminal PVDD and the gate of the driving transistor DT.

In one embodiment, in addition to the driving transistor DT, the data writing module 101, and the data line reset module 100, the pixel circuit 10 in the display panel 000 may also include a first light emitting control module 103, a second light emitting control module 104, a first reset module 105, a second reset module 106, a threshold compensation module 107, and a memory module 108. Optionally, the pixel circuit 10 may also include other modules such as a bias module (not shown in FIG. 15), etc. The present disclosure does not limit a specific module in the pixel circuit 10. The control terminal of the first light emitting control module 103 may be electrically connected to the first light emitting control signal terminal EM1. The control terminal of the second light emitting control module 104 may be electrically connected to the second light emitting control signal terminal EM2. The first light emitting control signal terminal EM1 and the second light emitting control signal terminal EM2 may be connected to a same light emitting control signal line in the display panel 000. The first light emitting control module 103 and the second light emitting control module 104 may be turned on simultaneously.

In the light emitting stage of the pixel circuit 10, the first light emitting control signal $V_{EM1}$ provided by the first light emitting control signal terminal EM1 may control the conduction and disconnection of the first terminal and the second terminal of the first light emitting control module 103. When the first terminal and the second terminal of the first light emitting control module 103 are turned on, the first power signal Vpvdd provided by the first power signal terminal PVDD may be provided to the driving transistor DT. Optionally, the first power signal terminal PVDD may be electrically connected to the first power signal line in the display panel 000. The second power signal terminal PVEE (used to provide the second power signal Vpvee) may be electrically connected to the second power signal line in the display panel 000. The first power signal may be a positive power signal, and the second power signal may be a negative power signal.

The second light emitting control signal $V_{EM2}$ provided by the second light emitting control signal terminal EM2 controls the conduction and disconnection of the first terminal and the second terminal of the second light emitting control module 104. When the first terminal and the second terminal of the second light emitting control module 104 are conducted, the first power signal terminal PVDD and the second power signal terminal PVEE may form a conductive path for the first light emitting control module 103, the driving transistor DT, and the second light emitting control module 104. The driving current may drive the light emitting element 20 to emit light.

The memory module 108 may be used to stabilize the potential of the gate of the driving transistor DT, and the driving transistor DT may thus be kept being turned on. The first terminal of the first reset module 105 may be electrically connected to the first reference voltage signal terminal REF1. The first terminal of the second reset module 106 may be electrically connected to the second reference voltage signal terminal REF2. The first reference voltage signal terminal REF1 and the second reference voltage signal terminal REF2 may be connected to a same reference voltage signal line in the display panel 000, or the first reference voltage signal terminal REF1 and the second reference voltage signal terminal REF2 may be connected to two different reference voltage signal lines in the display panel 000. The present disclosure does not limit whether the first reference voltage signal terminal REF1 and the second reference voltage signal terminal REF2 are connected to a same reference voltage signal line.

A control terminal of the first reset module 105 may be electrically connected to the third scan signal terminal. The third scan signal SCAN3 provided by the third scan signal terminal may control the conduction and disconnection of the first terminal and the second terminal of the first reset module 105. When the first terminal and the second terminal of the first reset module 105 are connected, the first reset signal Vref1 provided by the first reference voltage signal terminal REF1 may be transmitted to the gate of the driving transistor DT to perform a reset operation on the gate of the driving transistor DT. The control terminal of the second reset module 106 may be electrically connected to the fourth scan signal terminal, and the fourth scan signal SCAN4 provided by the fourth scan signal terminal may control the conduction and disconnection of the first terminal and the second terminal of the second reset module 106. When the first terminal and the second terminal of the second reset module 106 are turned on, the second reset signal Vref2 provided by the second reference voltage signal terminal REF2 may be transmitted to the anode of the light emitting element 20. The anode of the light emitting element 20 may be reset, and the anode of the light emitting element 20 may thus be initialized. Accordingly, in the display process, the residual display signal of a previous frame may be minimized, the afterimage phenomenon may be weakened, and the display effect may thus be improved.

The threshold compensation module 107 may be electrically connected between the gate electrode of the driving transistor DT and the second electrode of the driving transistor DT. The control terminal of the threshold compensation module 107 may be connected to a fifth scan signal terminal. The fifth scan signal SCAN5 provided by the fifth scan signal terminal may control the conduction and disconnection of the first terminal and the second terminal of the threshold compensation module 107. When the first terminal and the second terminal of the threshold compensation module 107 are turned on, the first terminal and the second terminal of the data writing module 101 may also be turned on. The threshold compensation voltage of the driving transistor DT may be captured through the data writing module 101 and the threshold compensation module 107. The threshold voltage of the driving transistor DT may be compensated while writing the data voltage signal.

Figure 16:
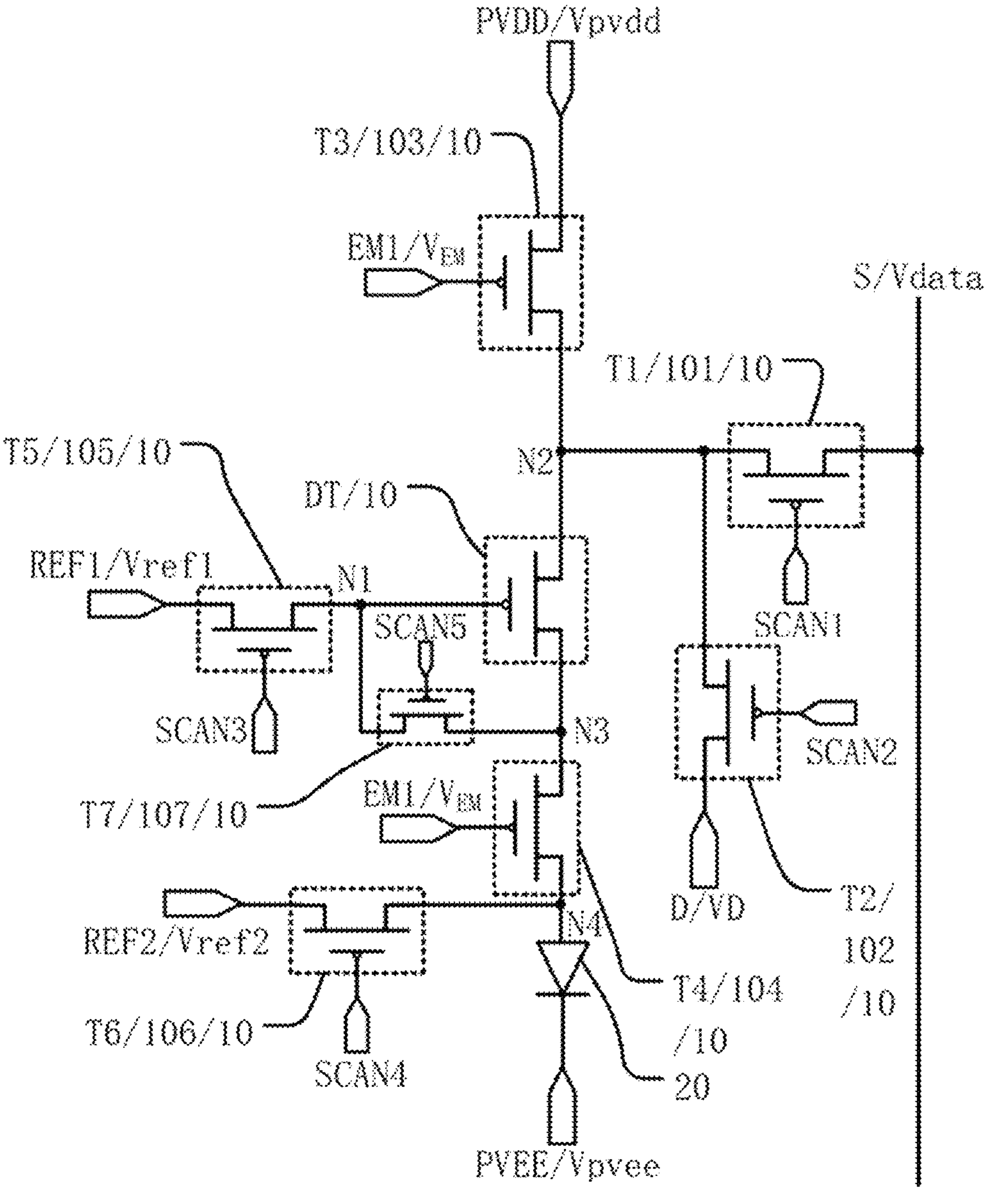
FIG. 16 illustrates a schematic diagram of a specific electrical connection structure of a sub-pixel in FIG. 15, consistent with the disclosed embodiments of the present disclosure.
Figure 17:
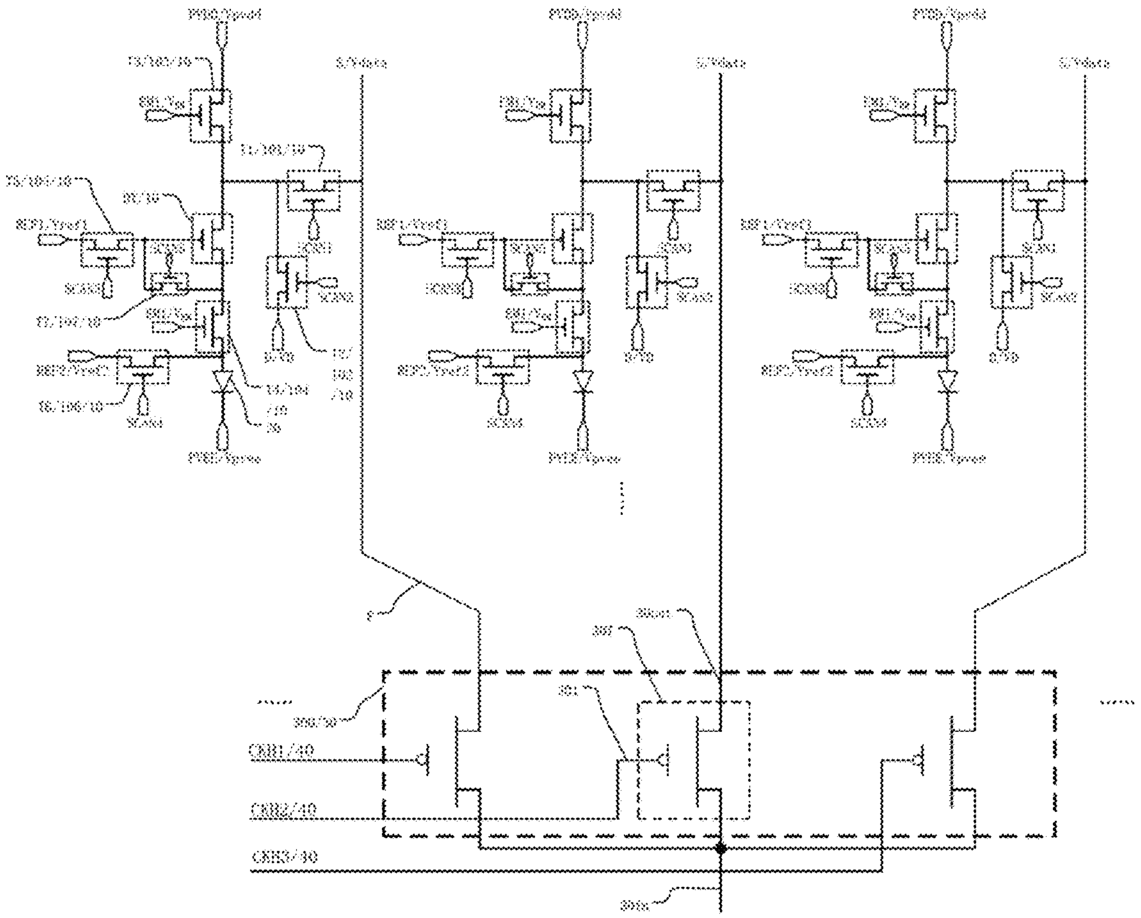
FIG. 17 illustrates a schematic diagram of an electrical connection structure of a plurality of sub-pixels and a multiplexing circuit in FIG. 16, consistent with the disclosed embodiments of the present disclosure.
Figure 18:
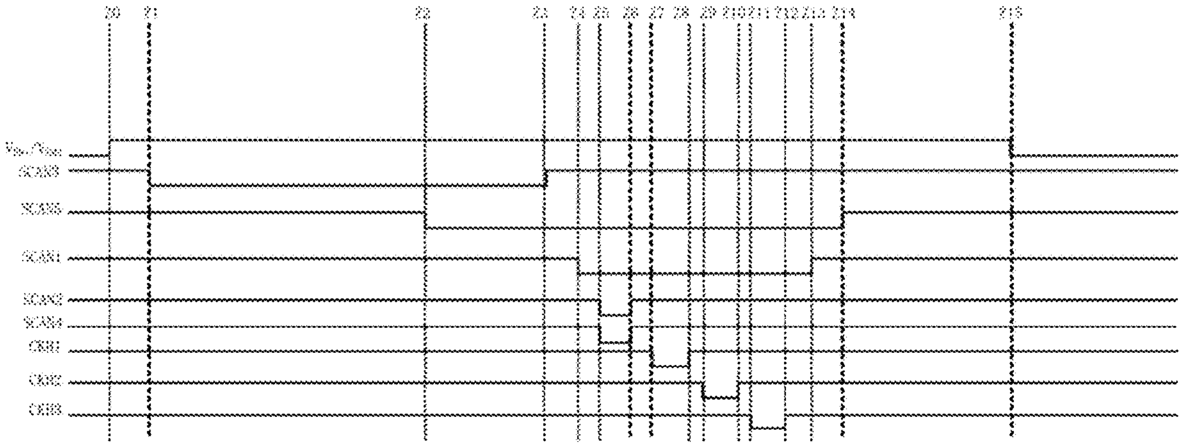
FIG. 18 illustrates an operation timing diagram of an electrical connection structure in FIG. 17, consistent with the disclosed embodiments of the present disclosure.

FIG. 16 illustrates a schematic diagram of a specific electrical connection structure of a sub-pixel in FIG. 15. FIG. 17 illustrates a schematic diagram of an electrical connection structure of a plurality of sub-pixels and a multiplexing circuit in FIG. 16. FIG. 18 illustrates an operation timing diagram of an electrical connection structure in FIG. 17. Referring to FIGS. 4, 15, 16, 7 and 18, in one embodiment, the first light emitting control module 103 includes a third transistor T3. A gate of the third transistor T3 is electrically connected to the first light emitting control signal terminal EM1. A first electrode of the third transistor T3 is electrically connected to the first power signal terminal PVDD, and a second electrode of the third transistor T3 is electrically connected to the first electrode of the driving transistor DT.

The second light emitting control module 104 includes a fourth transistor T4. A gate of the fourth transistor T4 is electrically connected to the second light emitting control signal terminal EM2. A first electrode of the fourth transistor T4 is electrically connected to the second electrode of the driving transistor DT, and a second electrode of the fourth transistor T4 is electrically connected to the anode of the light emitting element 20.

The first reset module 105 includes a fifth transistor T5. A gate of the fifth transistor T5 is electrically connected to the third scan signal terminal. A first electrode of the fifth transistor T5 is electrically connected to the first reference voltage signal terminal REF1, and a second electrode of the fifth transistor T5 is electrically connected to the gate electrode of the driving transistor DT.

The second reset module 106 includes a sixth transistor T6. A gate of the sixth transistor T6 is electrically connected to the fourth scan signal terminal. A first electrode of the sixth transistor T6 is connected to the second reference voltage signal terminal REF2, and a second electrode of the sixth transistor T6 is electrically connected to the anode of the light emitting element 20. The cathode of the light emitting element 20 is connected to the second power signal terminal PVEE.

The threshold compensation module 107 includes a seventh transistor T7. A gate of the seventh transistor T7 is electrically connected to the fifth scan signal terminal. A first electrode of the seventh transistor T7 is electrically connected to the gate of the driving transistor DT, and a second electrode of the seventh transistor T7 is electrically connected to the second electrode of the driving transistor DT.

The memory module 108 includes a first capacitor C1. A first electrode of the first capacitor C1 is electrically connected to the gate of the driving transistor DT, and a second electrode of the first capacitor C1 is electrically connected to the first power signal terminal PVDD.

In one embodiment, the pixel circuit 10 of each sub-pixel P in the display panel 000 may be a structure including a plurality of transistors and capacitors electrically connected. As shown in FIG. 16, the pixel circuit 10 may be an electrical connection structure including eight transistors and one capacitor. One of the transistors is the driving transistor DT, and the remaining transistors are switching transistors. Specifically, the pixel circuit 10 includes a first transistor T1, a second transistor T2, the driving transistor DT, a third transistor T3, a fourth transistor T4, a fifth transistor T5, a sixth transistor T6, a seventh transistor T7 and a first capacitor C1.

As shown in FIG. 16, in one embodiment, the pixel circuit 10 and the light emitting element 20 are electrically connected. The gate of the driving transistor DT represents the first node N1, the first electrode of the driving transistor DT represents the second node N2, and the second electrode of the driving transistor DT represents the third node N3. The anode of the light emitting element 20 serves as the fourth node N4. In FIG. 16, the transistor is a P-type transistor as an example for illustration. Optionally, in one embodiment, the first transistor T1, the second transistor T2, the driving transistor DT, the third transistor T3, the fourth transistor T4, the fifth transistor T5, the sixth transistor T6, and the seventh transistor T7 each are P-type low temperature polysilicon transistor. A low-temperature polysilicon transistors may have characteristics of high mobility and high driving speed. Accordingly, when the data writing module 101 writes the data voltage signal Vdata, the response speed of the driving transistor DT may be fast. As such, the data voltage signal Vdata may be quickly written, avoiding insufficient charging caused by the long turn-on time of the driving transistor DT.

The operation process of the circuit structure shown in FIG. 17 mainly includes 15 moments, including moments Z1, and Z1-Z14.

At moment Z0, the first light emitting control signal $V_{EM1}$ output by the first light emitting control signal terminal EM1 is at a high level. The second light emitting control signal $V_{EM2}$ output by the second light emitting control signal terminal EM2 is at a high level. The third transistor T3 and the fourth transistor T4 are each turned off, and the light emitting of a previous frame stops.

Moments Z1-Z6 are a reset stage. Moments Z1-ZA are the reset stage of the first node N1 and the third node N3.

At moment Z1, the third scan signal SCAN3 output from the third scan signal terminal is at a low level. The fifth transistor T5 is turned on, and other transistors are turned off. The first reset signal Vre1 provided by the first reference voltage signal terminal REF1 is written into the first node N1 to reset the first node N1 (that is, the gate of the driving transistor DT), and $V_{N1}$=Vref1.

At moment Z2, the fifth scan signal SCAN5 output from the fifth scan signal terminal is at a low level, and the seventh transistor T7 is turned on. The first reset signal Vref1 provided by the first reference voltage signal terminal REF1 is written into the third node N3 through the first node N1 to reset the third node N3 (ie, the second electrode of the driving transistor DT).

At moment Z3, the third scan signal SCAN3 output from the third scan signal terminal is at a high level. The fifth transistor T5 is turned off, and the reset of the first node N1 and the third node N3 ends.

Moments ZA-Z6 are the reset stage of the data line, and the reset stage of the second node N2 and the fourth node N4.

At moment Z4, the first scan signal SCAN1 output from the first scan signal terminal is at a low level, and the first transistor T1 is turned on.

At moment Z5, the second scan signal SCAN2 output from the second scan signal terminal is at a low level, and the second transistor T2 is turned on. The low-level data line reset signal VD provided by the data line reset signal terminal D is written into the second node N2 through the second transistor T2, and resets the second node N2 (i.e., the first electrode of the driving transistor DT). Simultaneously, the low-level data line reset signal VD provided by the data line reset signal terminal D is written into the data line S through the second transistor T2 and the first transistor T1, and completes the reset for the data line S in the display area. Simultaneously, at moment Z5, the fourth scanning signal SCAN4 output by the fourth scanning signal terminal is at a low level, and the sixth transistor T6 is turned on. The second reset signal Vref2 provided by the second reference voltage signal terminal REF2 is written into the fourth node N4 to reset the fourth node N4 (i.e., the anode of the light emitting element 20).

At moment Z6, the second scan signal SCAN2 output from the second scan signal terminal is at a high level, and the second transistor T2 is turned off. The fourth scan signal SCAN4 output from the fourth scan signal terminal is at a high level, the sixth transistor T6 is turned off, and the reset is completed.

Moments Z7-Z14 are a threshold compensation and data writing stage.

At moment Z7, the clock control signals CKH1, CKH2, and CKH3 of the multiplexing circuit 30 are written with a low level signal in sequence, and the switching transistors 30T in the multiplexing circuit 30 are turned on in sequence. The data voltage signals Vdata required for sub-pixels P of different colors are sequentially written into the corresponding data lines S in the display area. Simultaneously, at moment Z7, the first scan signal SCAN1 provided by the first scan signal terminal is at a low level, and the fifth scan signal SCAN5 provided by the fifth scan signal terminal is at a low level. Accordingly, the first transistor T1, the driving transistor DT, and the seventh Transistor T7 are turned on. The threshold-compensated data voltage signal on the data line S is written into the first node N1 via the first transistor T1, the driving transistor DT, and the seventh transistor T7. Finally, at moment Z14, the fifth scanning signal SCAN5 provided by the fifth scanning signal terminal is at a high level, and the first scanning signal SCAN1 provided by the first scan signal terminal is at a high level. Accordingly, the first transistor T1 and the seventh transistor T7 are each turned off, and the respective first nodes N1 in the sub-pixels P of different colors complete the threshold capture. At this moment, $V_{N1}$=Vdata+Vth, where Vth is a threshold voltage of the driving transistor DT.

After moment Z15 is the light emitting stage. The first light emitting control signal $V_{EM1}$ output from the first light emitting control signal terminal EM1 is at a low level. The second light emitting control signal $V_{EM2}$ output from the second light emitting control signal terminal EM2 is at a low level. The third transistor T3 and the fourth transistor T4 are turned on, and the display panel enters the light emitting stage.

It may be understood that in one embodiment, the cycle time of the clock control signals CKH1, CKH2, and CKH3 of the multiplexing circuit 30 is theoretically 1H. 1H represents the ratio of one frame time of the display panel to the quantity of all sub-pixel rows in the display panel. The interval between the scanning driving signal of the pixel circuit in the current sub-pixel row and the scanning driving signal of the pixel circuit in the next sub-pixel row is 1H. For the convenience of explanation, the timing diagram in FIG. 18 only draws the timing waveforms of the clock control signal from Z4 to Z13.

In one embodiment, before the data writing stage, in the data line reset stage, the second scanning signal SCAN2 provided by the second scanning signal terminal controls the second transistor T2 to be turned on. The first scan signal SCAN1 provided by the first scan signal terminal controls the first transistor T1 to be turned on. Accordingly, the operation of turning on the multiplexing circuit 30 to transmit the reset signal to reset the data line S before the data writing stage may be simplified. That is, the multiplexing circuit 30 does not need to perform switching operations on the clock control signals (CKH1-CKH3) before the data writing stage (before moment Z7 in FIG. 18). The multiplexing circuit 30 may just wait until the first transistor T1 is turned on in the data writing stage and the multiplexing circuit 30 is also turned on to transmit the data voltage signal. The conductive pad in the bonding area may reduce one time of transmitting the data voltage signal used for reset, and the quantity of the data voltage signal transitions may be reduced. As such, the driving power consumption of the multiplexing circuit 30 may be reduced, and the power consumption of the whole display panel 000 may be reduced. In the data writing stage (moments Z7-Z14 in FIG. 18), the conduction period of the multiplexing circuit 30 may be set to overlap with the conduction period of the first transistor T1, and the time for data writing may thus be sufficient. Accordingly, while achieving narrow frame design, display quality may be improved.

In one embodiment, the display panel 000 is an organic light emitting diode display panel. The sub-pixel P may include an electrical connection structure of a pixel circuit 10, a light emitting element 20, and a multiplexing circuit 30. In specific implementation, the electrical connection structure of the pixel circuit 10, the light emitting element 20 and the multiplexing circuit 30 included in the sub-pixel P may also include other implementation structures, which will not be elaborated here.

Figure 19:
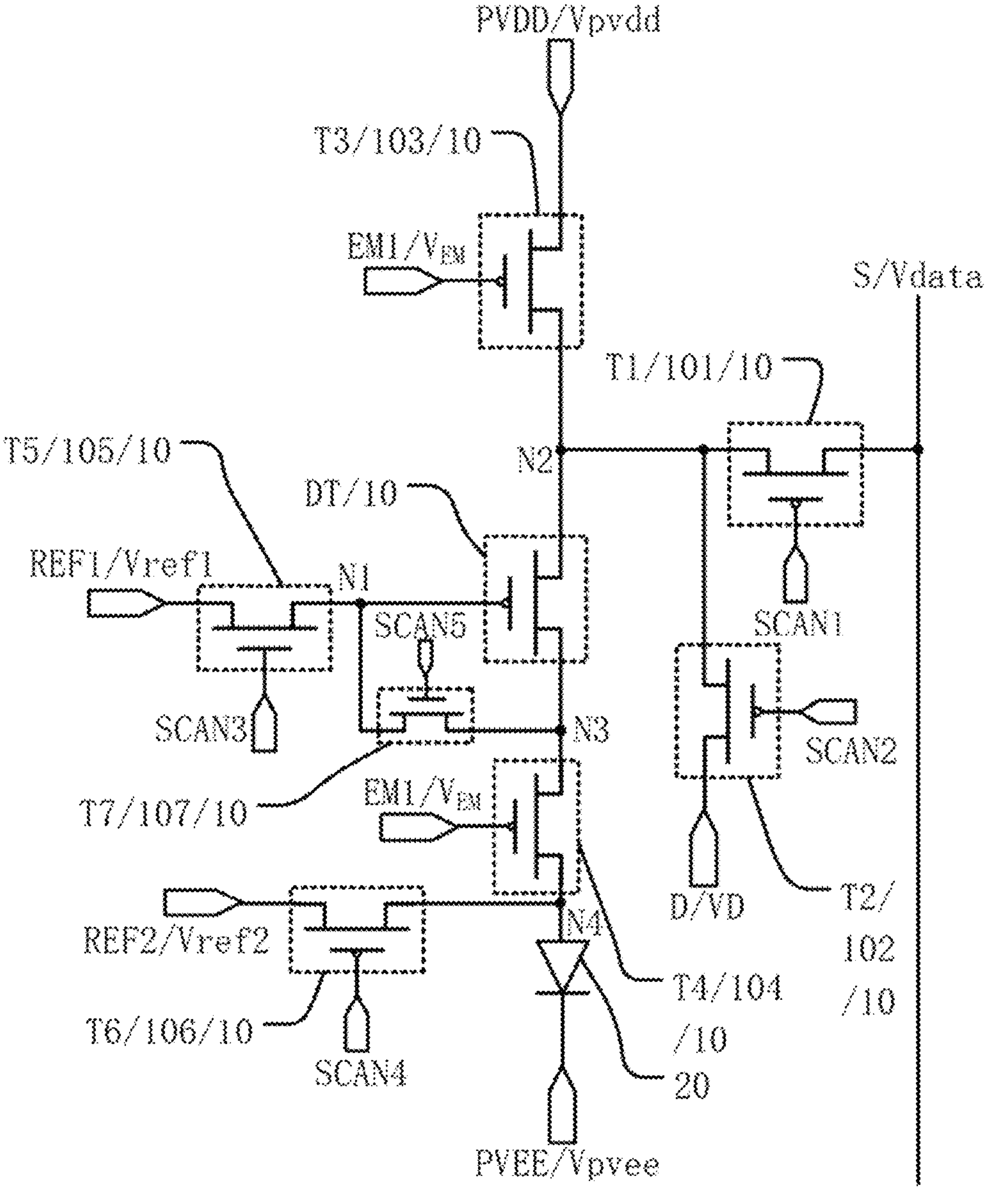
FIG. 19 illustrates a schematic diagram of another specific electrical connection structure of sub-pixels in FIG. 15, consistent with the disclosed embodiments of the present disclosure.
Figure 20:
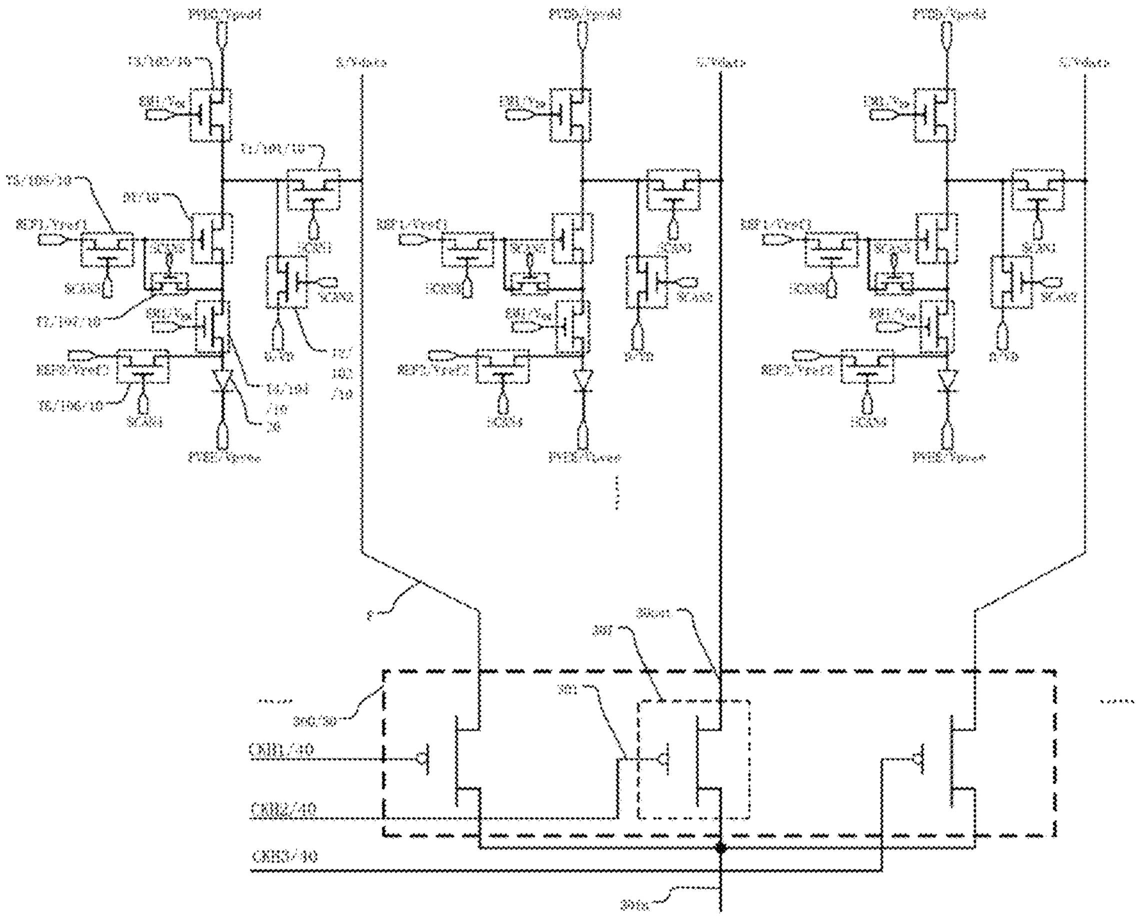
FIG. 20 illustrates a schematic diagram of an electrical connection structure of a plurality of sub-pixels and a multiplexing circuit in FIG. 15, consistent with the disclosed embodiments of the present disclosure.
Figure 21:
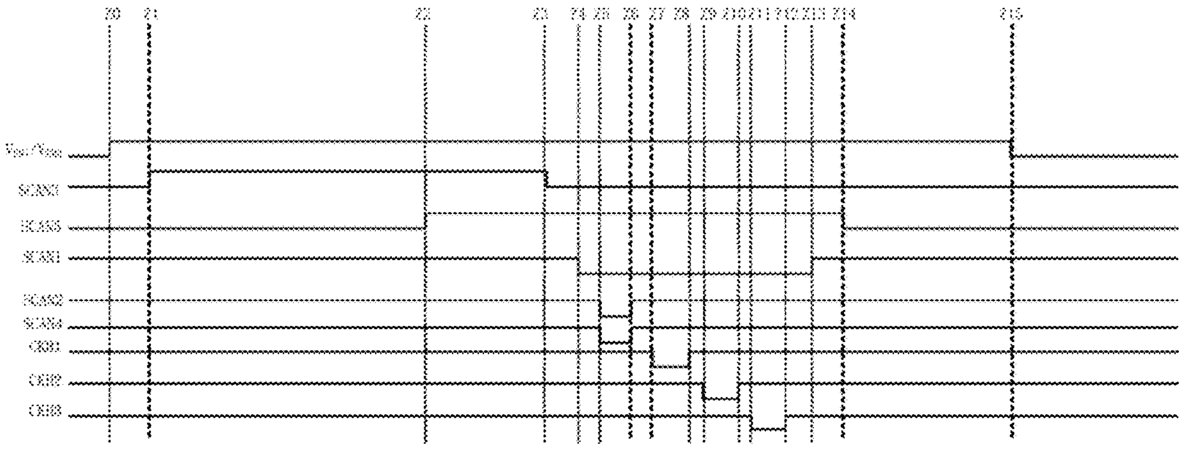
FIG. 21 illustrates an operation timing diagram of an electrical connection structure in FIG. 20, consistent with the disclosed embodiments of the present disclosure.

FIG. 19 illustrates a schematic diagram of another specific electrical connection structure of sub-pixels in FIG. 15. FIG. 20 illustrates a schematic diagram of an electrical connection structure of a plurality of sub-pixels and a multiplexing circuit in FIG. 15. FIG. 21 illustrates an operation timing diagram of an electrical connection structure in FIG. 20. Referring to FIGS. 4, 15, 19, 20 and 21, in one embodiment, the pixel circuit 10 of each sub-pixel P in the display panel 000 may be a structure including a plurality of transistors and capacitors electrically connected.

As shown in FIG. 19, the pixel circuit 10 may be an electrical connection structure including eight transistors and one capacitor. One of the transistors is the driving transistor DT, and the remaining transistors are switching transistors. Specifically, the pixel circuit 10 includes a first transistor T1, a second transistor T2, the driving transistor DT, a third transistor T3, a fourth transistor T4, a fifth transistor T5, a sixth transistor T6, a seventh transistor T7 and a first capacitor C1. As shown in FIG. 19, in one embodiment, the pixel circuit 10 and the light emitting element 20 are electrically connected. The gate of the driving transistor DT represents the first node N1, the first electrode of the driving transistor DT represents the second node N2, the second electrode of the driving transistor DT represents the third node N3, and the anode of the light emitting element 20 represents the fourth node N4.

Optionally, the first transistor T1, the second transistor T2, the driving transistor DT, the third transistor T3, the fourth transistor T4, and the sixth transistor T6 each are P-type low-temperature polysilicon transistors. The fifth transistor T5 and the seventh transistor T7 each are N-type oxide transistors, such as N-type indium gallium zinc oxide (IGZO) transistors. Since oxide transistors may have lower mobility and smaller leakage current than low-temperature polysilicon transistors, in one embodiment, the fifth transistor T5 and the seventh transistor T7 electrically connected to the gate of the driving transistor DT are configured as N-type IGZO transistors. Accordingly, the charge leakage of the driving transistor DT gate in low-frequency driving may be prevented, the leakage current problem in low-frequency driving may be addressed, and the pixel circuit 10 may be suitable for low-frequency driving. The transistors of other modules of the pixel circuit 10 may still be low-temperature polysilicon transistors. By using low-temperature polysilicon transistors, the pixel circuit 00 may still maintain strong driving capabilities under low-frequency driving. Accordingly, the power consumption of the display panel using the pixel circuit 00 may be reduced.

It may be understood that, in one embodiment, when other modules, such as the data writing module 101, include the first transistor T1, the transistors of this module may still be designed as P-type low-temperature polysilicon transistors. As such, the pixel circuit 10 may maintain a strong driving capability by using low-temperature polysilicon transistors, provided that IGZO transistors are used for parts of the pixel circuit 10 that are prone to leakage (such as the part connected to the gate of the driving transistor DT). The pixel circuit 10 combines two types of thin film transistors: low-temperature polysilicon transistors and indium gallium zinc oxide transistor. Accordingly, the display panel using the pixel circuit 00 may have strong driving capability and low power consumption simultaneously, and may be suitable for high-frequency display and low-frequency display.

The present disclosure does not elaborate on the operation process of the circuit structure shown in FIG. 20. Details may be understood by referring to the circuit structure of FIG. 17 corresponding to FIG. 18 and the operation sequence shown in FIG. 21. The difference between the operation sequence of FIG. 21 and the operation sequence of FIG. 18 is as follows. In FIG. 18, the fifth transistor T5 is turned on when the third scanning signal SCAN3 provided by the third scanning signal terminal is at a low level, and the seventh transistor T7 is turned on when the fifth scan signal SCAN5 provided by the fifth scan signal terminal is at a low level. In FIG. 21, the fifth transistor T5 is turned on when the third scan signal SCAN3 provided by the third scan signal terminal is at a high level, and the seventh transistor T7 is turned on when the fifth scan signal SCAN5 provided by the fifth scan signal terminal is at a high level. Phases of the third scanning signal SCAN3 and the fifth scanning signal SCAN5 in FIG. 21 are opposite to phases of the third scanning signal SCAN3 and the fifth scanning signal SCAN5 in FIG. 18.

Figure 22:
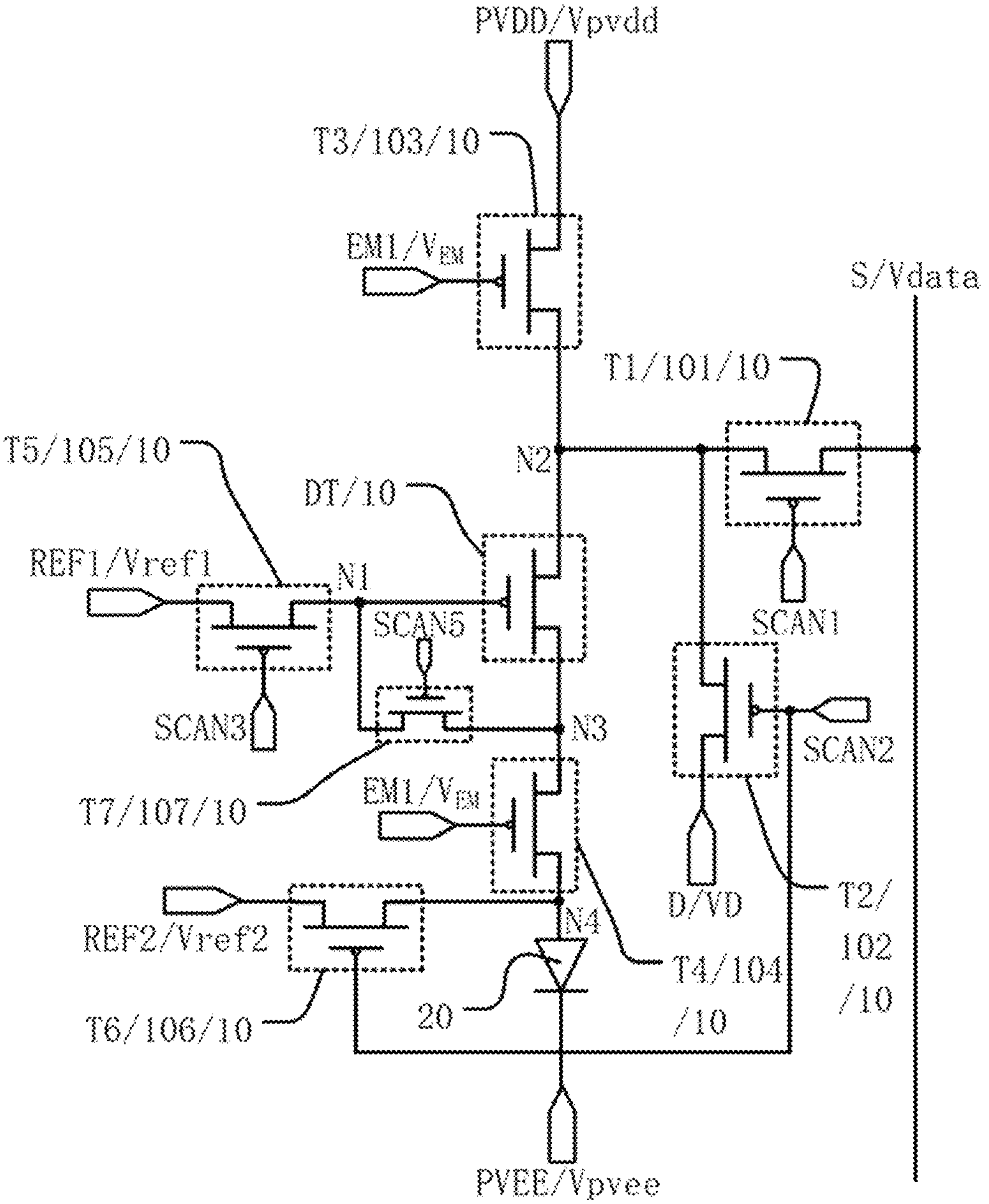
FIG. 22 illustrates a schematic diagram of another electrical connection structure of sub-pixels in FIG. 4, consistent with the disclosed embodiments of the present disclosure.
Figure 23:
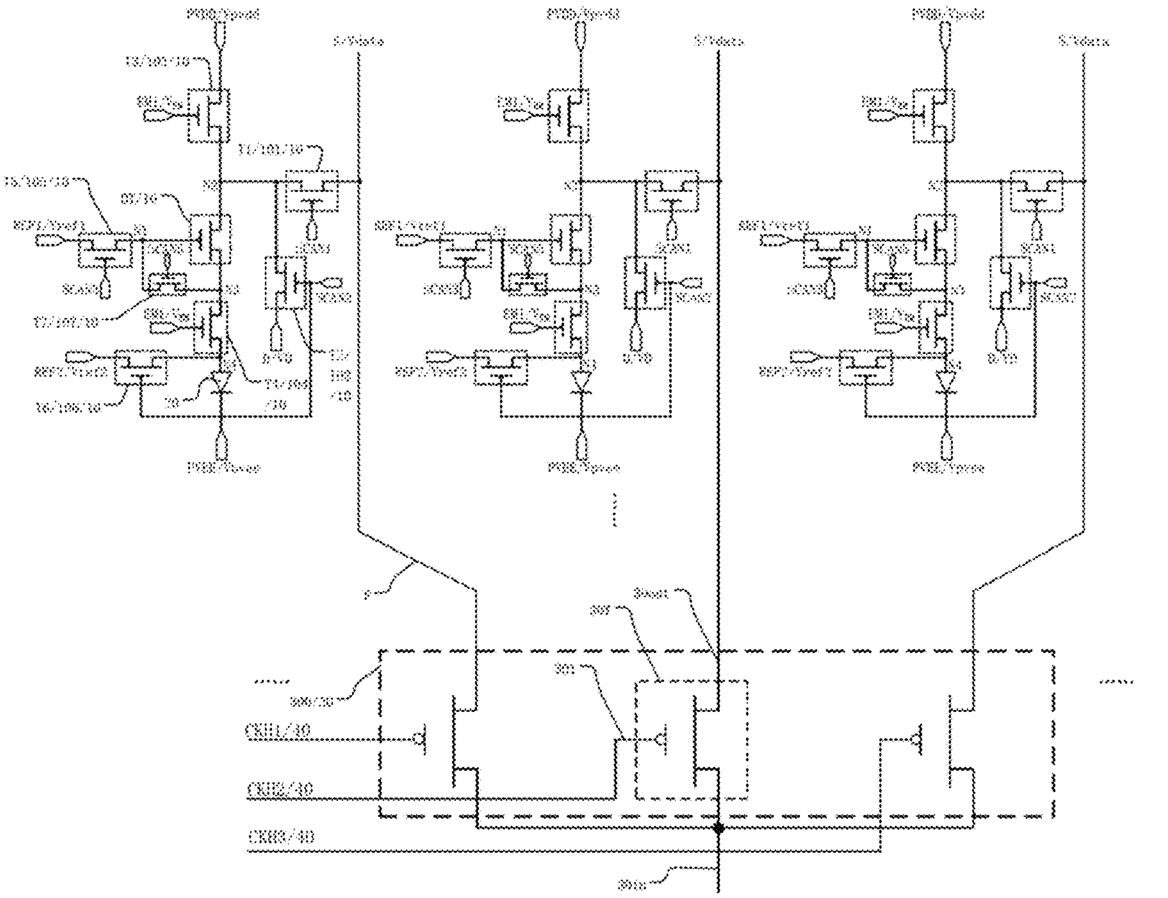
FIG. 23 illustrates a schematic diagram of another electrical connection structure between a plurality of sub-pixels and a multiplexing circuit in FIG. 4, consistent with the disclosed embodiments of the present disclosure.
Figure 24:
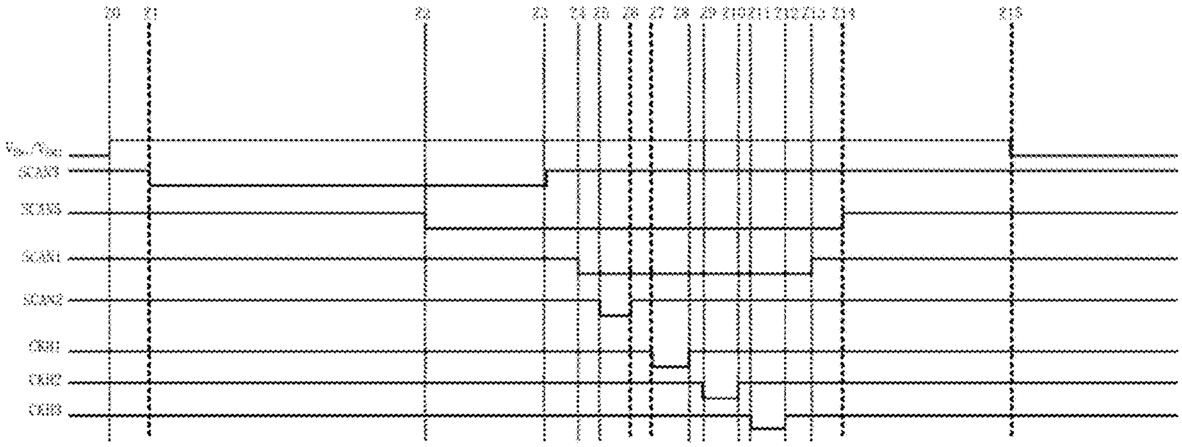
FIG. 24 illustrates an operation timing diagram of an electrical connection structure in FIG. 23, consistent with the disclosed embodiments of the present disclosure.

FIG. 22 illustrates a schematic diagram of another electrical connection structure of sub-pixels in FIG. 4. FIG. 23 illustrates a schematic diagram of another electrical connection structure between a plurality of sub-pixels and a multiplexing circuit in FIG. 4. FIG. 24 illustrates an operation timing diagram of an electrical connection structure in FIG. 23. Referring to FIGS. 4, 22, 23 and 24, in one embodiment, the pixel circuit 10 also includes a second reset module 106. The second reset module 106 includes a sixth transistor T6. A gate of the sixth transistor T6 is electrically connected to a second scan signal terminal 1021. A first electrode of the sixth transistor T6 is electrically connected to the second reference voltage signal terminal REF2. A second electrode of the sixth transistor T6 is electrically connected to the anode of the light emitting element 20. The cathode of the light emitting element 20 is connected to the second power signal terminal PVEE. The conduction period of the data line reset module 102 and the conduction period of the second reset module 106 at least partially overlap.

In one embodiment, the pixel circuit 10 also includes a second reset module 106, and the second reset module 106 includes a sixth transistor T6. The first electrode of the sixth transistor T6 is electrically connected to the second reference voltage signal terminal REF2. The second electrode of the sixth transistor T6 is electrically connected to the anode of the light emitting element 20. The cathode of the light emitting element 20 is connected to the second power signal terminal PVEE. In the reset stage, under the control signal provided by the gate of the sixth transistor T6, the second reset signal Vref2 provided by the second reference voltage signal terminal REF2 may be provided to the anode of the light emitting element 20 to reset the light emitting element 20. As such, the light emitting element 20 anode may be initialized. Accordingly, the residue of the display signal of the previous frame in the display process may be reduced, the afterimage phenomenon may be weakened, and the display effect may be improved.

The data line reset module 102 includes a second transistor T2. A gate of the second transistor T2 is electrically connected to the second scan signal terminal 1021. The second transistor T2 included in the data line reset module 102 may be used to, in the reset stage, under the control of the second scan signal SCAN2 provided by the second scan signal terminal 1021, provide the data line reset signal VD to the data line S to reset the data line S.

In one embodiment, the conduction period of the data line reset module 102 at least partially overlaps with the conduction period of the second reset module 106. That is, the conduction time of the sixth transistor T6 and the conduction time of the second transistor T2 at least partially overlap. The reset time for the anode of the light emitting element 20 and the reset time for the data line S at least partially overlap. When the sixth transistor T6 and the second transistor T2 are of a same type, such as P-type transistors, the sixth transistor T6 and the second transistor T2 are each turned on under a low-potential signal. When the sixth transistor T6 and the second transistor T2 are of a same type, such as N-type transistors, the sixth transistor T6 and the second transistor T2 are each turned on under a high potential signal. Accordingly, the sixth transistor T6 and the second transistor T2 may share the second scan signal terminal 1021. As such, the gate of the sixth transistor T6 may be electrically connected to the second scan signal terminal 1021. That is, the gate of the sixth transistor T6 and the gate of the second transistor T2 may be controlled by the second scan signal SCAN2 provided by a same second scan signal terminal 1021 to turn on or not.

When arranging scan lines on the panel, the gate of the sixth transistor T6 and the gate of the second transistor T2 in the pixel circuits 10 of a same sub-pixel row may be connected to a same scan line. Accordingly, the quantity of driving signals may be reduced, the quantity of overall signal lines in the display panel 000 may be reduced, and layout space may be saved. As such, a larger space size for the layout of the pixel circuit 10 may be provided, a narrow frame of the panel may be realized, and panel transmittance may be increased by reducing the quantity of signal lines in the panel.

Figure 25:
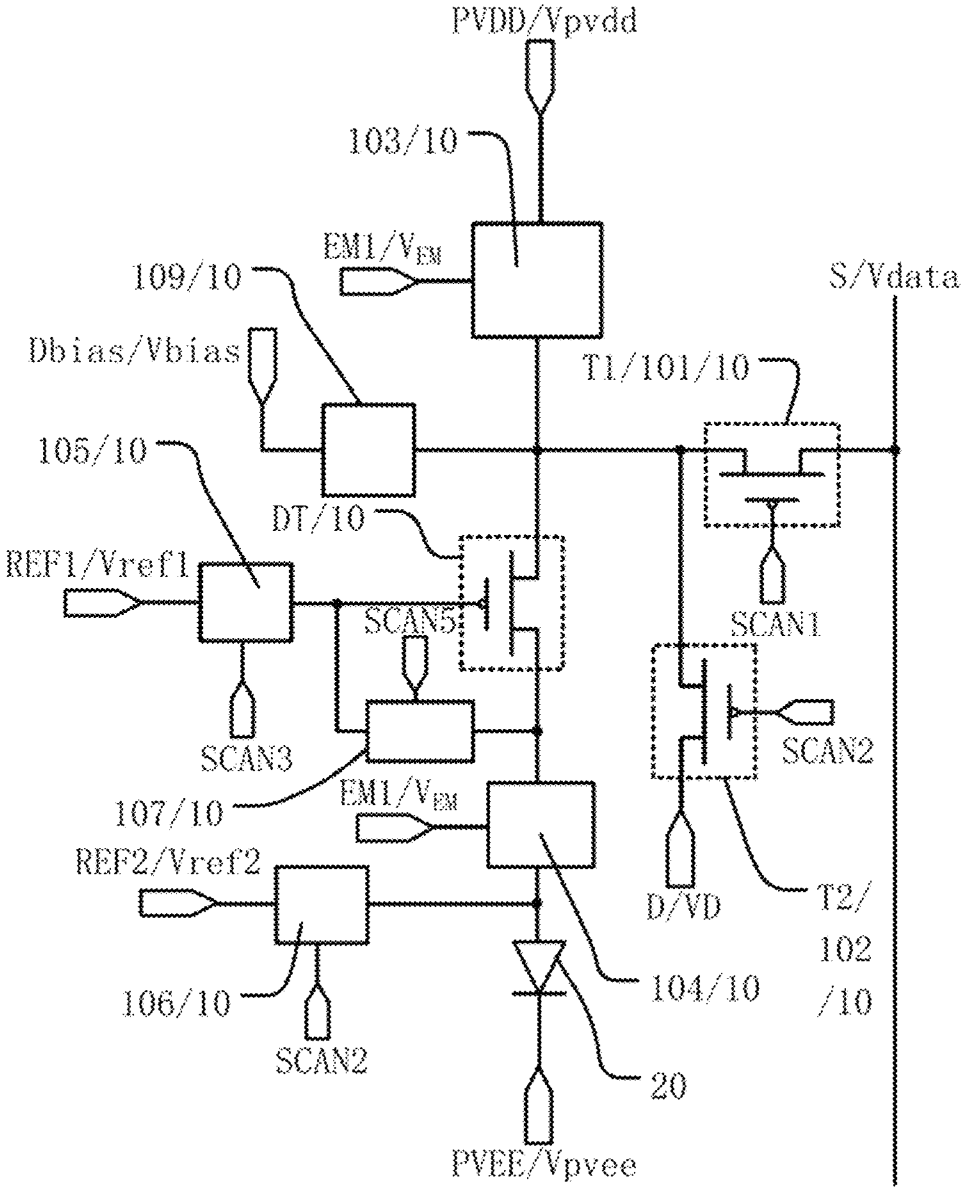
FIG. 25 illustrates a schematic diagram of another electrical connection structure of sub-pixels in FIG. 4, consistent with the disclosed embodiments of the present disclosure.
Figure 26:
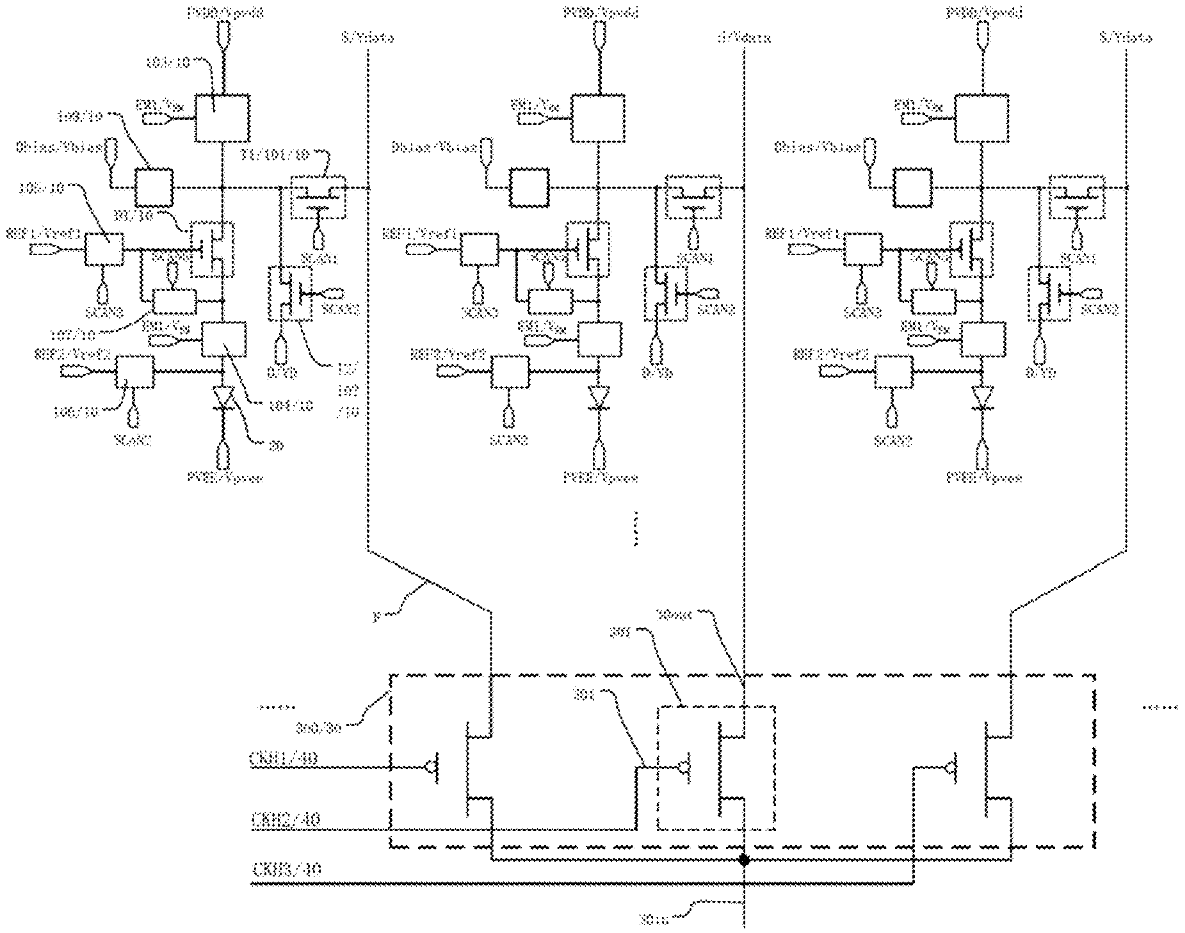
FIG. 26 illustrates a schematic diagram of another electrical connection structure between a plurality of sub-pixels and a multiplexing circuit in FIG. 4, consistent with the disclosed embodiments of the present disclosure.

FIG. 25 illustrates a schematic diagram of another electrical connection structure of sub-pixels in FIG. 4. FIG. 26 illustrates a schematic diagram of another electrical connection structure between a plurality of sub-pixels and a multiplexing circuit in FIG. 4. Referring to FIGS. 4, 25 and 26, in one embodiment, the display panel 000 includes a bias adjustment module 109. A first terminal of the bias adjustment module 109 is electrically connected to the first electrode of the driving transistor DT. A second terminal of the bias adjustment module 109 is electrically connected to the bias adjustment signal terminal Dbias.

In one embodiment, the pixel circuit 10 of the display panel 000 also includes a bias adjustment module 109. The first terminal of the bias adjustment module 109 is electrically connected to the first electrode of the driving transistor DT, and the second terminal of the bias adjustment module 109 is electrically connected to the bias adjustment signal terminal Dbias. The bias adjustment signal terminal Dbias may be used to provide a bias adjustment signal Vbias for adjusting the bias state of the driving transistor DT. By controlling the bias adjustment module 109 to write the bias adjustment signal Vbias to the first electrode of the driving transistor DT in part of the operation time of the pixel circuit 10, the bias state of the driving transistor DT may be adjusted. Accordingly, the threshold drift problem of the driving transistor DT may be addressed, and the display effect may be improved.

The present disclosure does not limit the operation time of the bias adjustment module 109, provided that the operation of the bias adjustment module 109 is before the light emitting element 20 emits light. Optionally, in one embodiment, the bias adjustment signal Vbias may be provided by a bias signal line (not shown in FIG. 25) in the display panel 000. In some other optional embodiments, the bias adjustment signal Vbias may multiplex the driving signal included in the pixel circuit 10. The present disclosure does not limit whether the bias adjustment signal Vbias is provided by a bias signal line.

Figure 27:
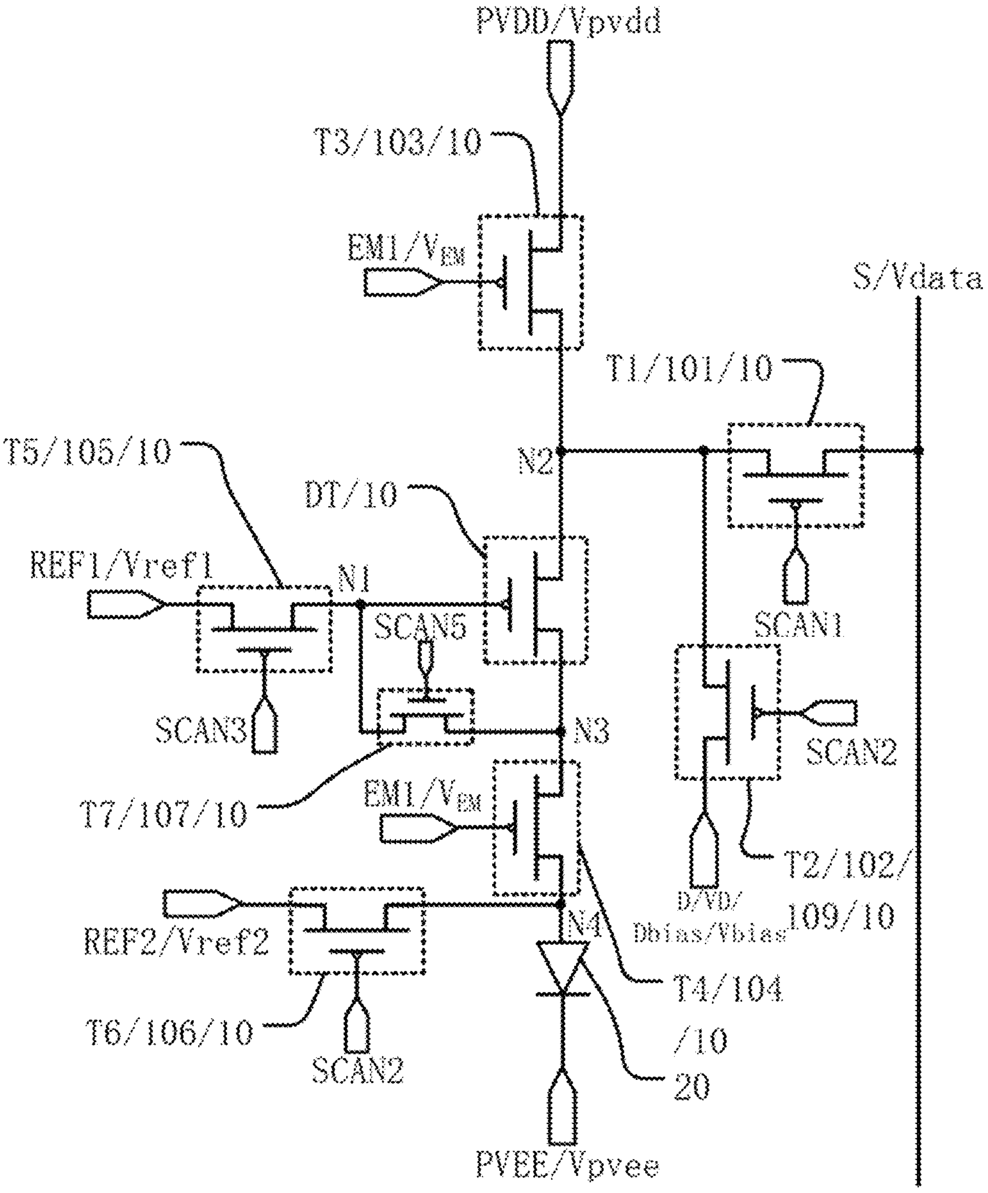
FIG. 27 illustrates a schematic diagram of another electrical connection structure of a sub-pixel in FIG. 4, consistent with the disclosed embodiments of the present disclosure.
Figure 28:
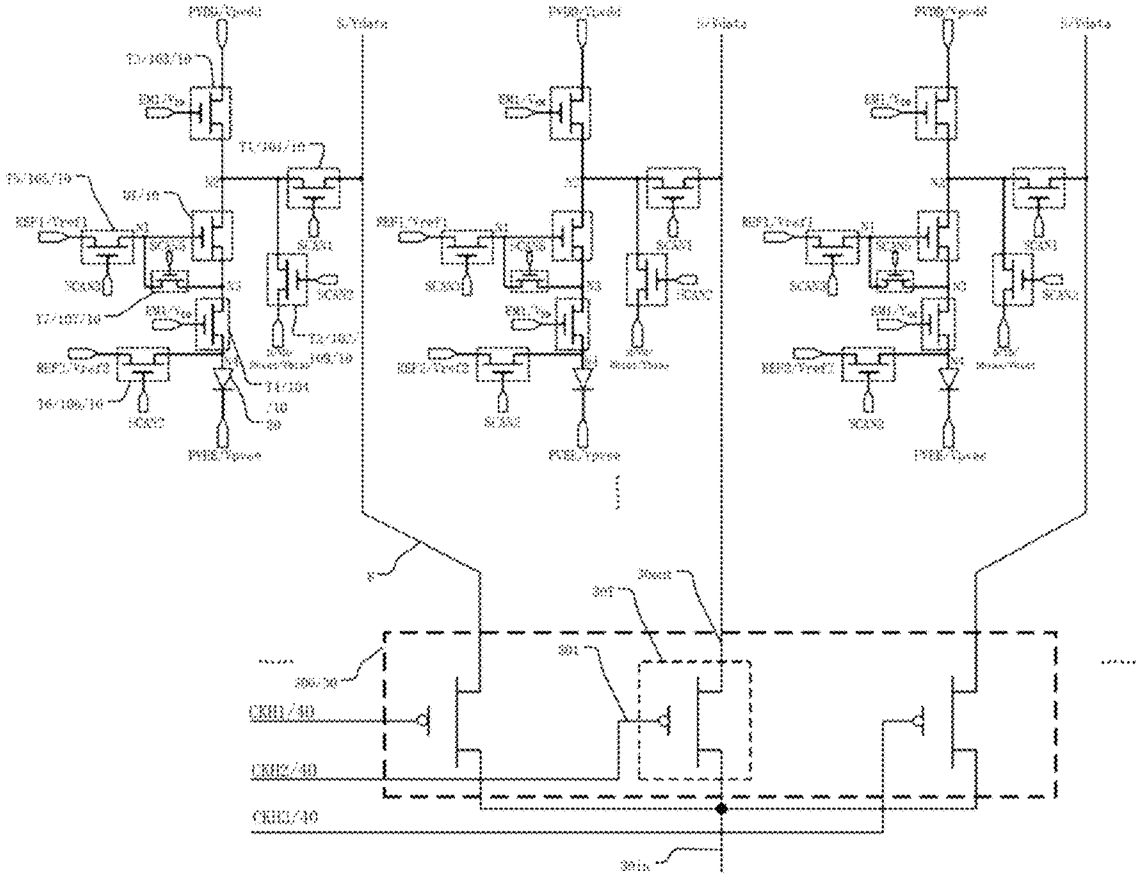
FIG. 28 illustrates a schematic diagram of another electrical connection structure between a plurality of sub-pixels and a multiplexing circuit in FIG. 4, consistent with the disclosed embodiments of the present disclosure.

FIG. 27 illustrates a schematic diagram of another electrical connection structure of a sub-pixel in FIG. 4. FIG. 28 illustrates a schematic diagram of another electrical connection structure between a plurality of sub-pixels and a multiplexing circuit in FIG. 4. Referring to FIGS. 4, 27 and 28, in one embodiment, the data line reset module 102 is multiplexed as the bias adjustment module 109, and the data line reset signal terminal D is multiplexed as the bias adjustment signal terminal Dbias.

In one embodiment, the data line reset module 102 in the pixel circuit 10 may be multiplexed as the bias adjustment module 109. That is, in the data line reset stage, when the second scan signal terminal controls the first terminal and the second terminal of the data line reset module 102 to be turned on, the low-voltage data line reset signal VD provided by the data line reset signal terminal D may be used to adjust the bias voltage of the drive transistor DT. Under the control of the second scan signal SCAN2 provided by the second scan signal terminal, the data line reset signal VD may be provided to the first electrode of the drive transistor DT to adjust the bias state of the drive transistor DT. Accordingly, the drive transistor DT may be reverse biased, and the first and second electrodes of the driving transistor DT may be inverted. As such, the internal ion polarization of the driving transistor DT may be weakened, and the threshold voltage of the driving transistor DT may be reduced. Accordingly, the adjustment of the threshold voltage of the driving transistor DT may be realized by multiplexing the second transistor T2 of the data line reset module 102. The threshold voltage drift caused by the hysteresis effect of the driving transistor DT due to the forward-biased state of the driving transistor DT may be compensated. As such, effects on the display quality due to the hysteresis effect of the driving transistor DT in the display panel 000 may be weakened, and the display quality may be improved. Since the data line reset module 102 is multiplexed as the bias adjustment module 109, the quantity of transistors in the pixel circuit 10 may be reduced. As such, the aperture ratio of sub-pixel 00 in the panel may be increased, and the panel layout space may be saved.

Still referring to FIGS. 1 and 2, the present disclosure also provides a driving method for a display panel. This driving method may be used to drive the display panel 000 provided by the present disclosure. The driving method at least includes a data line reset stage and a data writing stage, and the data line reset stage is executed before the data writing stage.

In the data line reset stage, the data line reset module 102 is turned on. The data line reset signal terminal D transmits the data line reset signal VD to the data line S through the data line reset module 102 to reset the data line S. In the data writing stage, the data writing module 101 is turned on, and transmits the data voltage signal Vdata of the data line S to the driving transistor DT.

The driving method provided by the present disclosure may be applied to the display panel 000 illustrated in FIGS. 1 and 2. In the structure of the display panel 000, the pixel circuit 10 includes a data line reset module 102. The first terminal of the data line reset module 102 is electrically connected to the data line S, and the second terminal of the data line reset module 102 is electrically connected to the data line reset signal terminal D. The data line reset signal terminal D may be used to provide the data line reset signal VD.

In the driving method, the data line reset stage is performed before the data writing stage. When the pixel circuit 10 of the display panel 000 operates in the data line reset stage, the data line reset module 102 is turned on. That is, the first terminal and the second terminal of the data line reset module 102 are conducted, and the data line reset signal provided by the data line reset signal terminal D electrically connected to the second terminal of the data line reset module 102 may be transmitted to the data line S, to reset the data line S. Accordingly, the data line reset signal VD provided by the data line reset signal terminal D may be used to clear the residual data voltage value on the data line S of a previous frame before the start of a next frame, to reset the data line S.

The driving method then proceeds to the data writing stage. The data voltage signal Vdata on the data line S may be written into the driving transistor DT, such that the data voltage signal Vdata provided by the data line S of the next frame may avoid the interference by the residual value of the previous frame as much as possible. Then, in the data writing stage of the next frame, the data voltage signal Vdata on the data line S may be fast and fully written into the driving transistor DT through the data writing module 101. Accordingly, the problem of insufficient threshold compensation of the driving transistor DT in the pixel circuit 10 may be addressed, display uniformity may be improved, and display quality may be improved. In addition, the increase of the time of the data writing stage may not be needed, and power consumption may thus be reduced.

Still referring to FIGS. 4-8, in some optional embodiments, the display panel 000 also includes a multiplexing circuit 30. The first terminal of the data writing module 101 is electrically connected to the first electrode of the driving transistor DT, and the second terminal of the data writing module 101 is electrically connected to one terminal of the data line S. The other terminal of the data line S is electrically connected to the output terminal of the multiplexing circuit 30.

In the data writing stage, the data writing module 101 is turned on and the data line reset module 102 is turned off. The multiplexing circuit 30 is turned on. The multiplexing circuit 30 may transmit the data voltage signal Vdata to the data line S, and then to the driving transistor DT through the data line S.

The driving method may be applied to the display panel 000 including the multiplexing circuit 30. Narrow frames may be achieved for the display panel 000 including the multiplexing circuit 30. Details may be understood with reference to the structure of the multiplexing circuit 30 described in the present disclosure, and will not be elaborated here.

Following the driving method, in the data writing stage, the data writing module 101 is turned on, the data line reset module 102 is turned off, and the multiplexing circuit 30 is turned on. The multiplexing circuit 30 may transmit the data voltage signal Vdata to the data line S. The data voltage signal Vdata may be directly transmitted to the driving transistor DT through the data line S. That is, in the data writing stage, the conduction period of the multiplexing circuit 30 overlaps with the conduction period of the data writing module 101. That is, while the first terminal and the second terminal of the data writing module 101 are conducted in the data writing stage, the multiplexing circuit 30 is also turned on. While the data voltage signal is transmitted to the data line S through the multiplexing circuit 30, the data writing module 101 is also turned on. Accordingly, the data voltage signal transmitted on the data line S may be synchronously written into the driving transistor DT. By arranging the multiplexing circuit 30 and the driving method of directly writing the data voltage signal to the gate of the driving transistor DT, a narrow frame design of the display panel 000 may be realized, and long data writing time may be achieved when the panel is driven. Accordingly, the threshold compensation of the driving transistor DT may be sufficient, display uniformity may be improved, and display quality may be improved.

Still referring to FIGS. 4, 15-18, in some embodiments, in the display panel 000 where the driving method is applied, the pixel circuit 10 also includes a first light emitting control module 103, a second light emitting control module 104, a first reset module 105, a second reset module 106, and a threshold compensation module 107.

A first terminal of the first light emitting control module 103 is electrically connected to a first power signal terminal PVDD. A second terminal of the first light emitting control module 103 is electrically connected to the first electrode of the driving transistor DT.

A first terminal of the second light emitting control module 104 is electrically connected to the second electrode of the driving transistor DT. A second terminal of the second light emitting control module 104 is electrically connected to an anode of the light emitting element 20. A cathode of the light emitting element 20 is electrically connected to a second power signal terminal PVEE.

A first terminal of the first reset module 105 is electrically connected to a first reference voltage signal terminal REF1. A second terminal of the first reset module 105 is electrically connected to the gate of the driving transistor DT.

A first terminal of the second reset module 106 is electrically connected to a second reference voltage signal terminal REF2. A second terminal of the second reset module 106 is electrically connected to the anode of the light emitting element 20.

The threshold compensation module 107 is electrically connected between the gate electrode of the driving transistor DT and the second electrode of the driving transistor DT.

In one embodiment, the driving method also includes a first reset stage, a second reset stage and a light emitting stage. The data writing stage is executed between the second reset stage and the light emitting stage.

The first reset stage may be understood as a reset stage of the first node N1. At moments Z1-Z3 shown in FIG. 18, in the first reset stage, the first reset module 105 is turned on. The first reset signal Vref1 provided by the first reference voltage signal terminal REF1 is transmitted to the gate of the driving transistor DT (i.e., the first node N1) to reset the gate of the driving transistor DT.

The second reset stage may be understood as a reset stage of the fourth node N4. At moments Z5-Z6 shown in FIG. 18, in the second reset stage, the second reset module 106 is turned on. The second reset signal Vref2 provided by the second reference voltage signal terminal REF2 is transmitted to the anode of the light emitting element 20 (i.e., the fourth node N4) to reset the anode of the light emitting element 20.

In the light emitting stage, after moment Z15 shown in FIG. 18, the first light emitting control module 103, the second light emitting control module 104, and the driving transistor DT are turned on. The driving current generated by the driving transistor DT is transmitted to the light emitting element 20 to drive the light emitting element 20 to emit light.

The threshold compensation module 107 may detect and self-compensate for the deviation of the threshold voltage of the driving transistor DT in the data writing stage. The moments Z7-Z14 shown in FIG. 18 are the threshold compensation and data writing stage.

In the driving method, the execution period of the data line reset stage (moments ZA-Z6 shown in FIG. 18) and the execution period of the second reset stage (moments Z5-Z6 shown in FIG. 18) at least partially overlap. That is, the conduction time of the data line reset module 102 and the conduction time of the second reset module 106 may partially overlap. That is, the reset time for the anode of the light emitting element 20 and the reset time for the data line S at least partially overlap. Accordingly, the conduction control signal terminal of the data line reset module 102 and the conduction control signal terminal of the second reset module 106 may share a signal terminal. As such, the quantity of driving signals may be reduced, the overall quantity of signal lines in the display panel 000 may be reduced, and the layout space may be saved. The narrow frame of the panel may be achieved, and the panel transmittance may be increased by reducing the quantity of signal lines in the panel.

It may be understood that the above description only briefly illustrates the operation stages of the panel included in the driving method. Specific driving stages in panel operation may be understood with reference to descriptions in the present disclosure corresponding to FIG. 18, and will not be elaborated here.

Still referring to FIGS. 4, 27 and 28, in some optional embodiments, the display panel 000 applying the driving method provided by the present disclosure may include a bias adjustment module. The first terminal of the bias adjustment module is electrically connected to the first electrode of the driving transistor DT. The second terminal of the bias adjustment module is electrically connected to the bias adjustment signal terminal. The data line reset module 102 may be multiplexed as a bias adjustment module. The data line reset signal terminal D may be multiplexed as a bias adjustment signal terminal. By using the data line reset module 102 multiplexed as the bias adjustment module, the bias adjustment signal (ie, the data line reset signal VD) may be written into the first electrode of the driving transistor DT in part of the operation time of the pixel circuit 10. Accordingly, the bias state of the driving transistor DT may be adjusted, the threshold drift problem of the driving transistor DT may be addressed, and the display effect may be improved.

In one embodiment, the driving method also includes a first bias adjustment stage. The first bias adjustment stage is executed before the data writing stage. Since the data line reset module 102 may be multiplexed as the bias adjustment module, the execution time of the first bias adjustment stage may overlap with the execution time of the data line reset stage. In one embodiment, since the execution time of the first bias adjustment stage may overlap with the execution time of the data line reset stage, the driving time of the panel may be saved, the refresh frequency of the panel may be increased, and high-frequency driving may be achieved. That is, in the first bias adjustment stage, the data line reset module 102 is turned on, and the data line reset signal VD is provided to the first electrode of the driving transistor DT to adjust the bias state of the driving transistor. Simultaneously, the data line reset signal VD is transmitted to the data line S through the data line reset module 102 and the data writing module 101 to reset the data line S.

Following the driving method, in the data line reset stage, when the second scan signal terminal controls the first terminal and the second terminal of the data line reset module 102 to turn on, the low-voltage data line reset signal VD provided by the data line reset signal terminal D may be used to adjust the bias voltage of the drive transistor DT. Under the control of the second scan signal SCAN2 provided by the second scan signal terminal, the data line reset signal VD may be provided to the first electrode of the drive transistor DT to adjust the bias state of the drive transistor DT. Accordingly, the drive transistor DT may be reversely biased, and the first electrode and the second electrode of the driving transistor DT may be inverted. As such, the internal ion polarization of the driving transistor DT may be weakened, and the threshold voltage of the driving transistor DT may be reduced. Accordingly, the adjustment of the threshold voltage of the driving transistor DT may be realized by multiplexing the second transistor T2 of the data line reset module 102. The threshold voltage drift caused by the hysteresis effect of the driving transistor DT due to the forward-biased state of the driving transistor DT may be compensated. As such, impacts on the display effect due to the hysteresis effect of the driving transistor DT in the display panel 000 may be reduced, and the display effect may thus be improved. Simultaneously, the data line reset signal VD may be transmitted to the data line S through the data line reset module 102 and the data writing module 101 to reset the data line S. Accordingly, the data voltage signal Vdata on the data line S of a next frame may avoid the interference by the residual value of a previous frame as much as possible. As such, in the data writing stage of the next frame, the data voltage signal Vdata on the data line S may be fast and fully written into the driving transistor DT through the data writing module 101. As a result, the problem of insufficient threshold compensation of the driving transistor DT in the pixel circuit 10 may be addressed, the display uniformity may be improved, and display quality may be improved.

Referring to FIGS. 4, 24, 27, and 28, in one embodiment, the data line reset module 102 may be multiplexed as the bias adjustment module, and the reset signal terminal D of the data line may be multiplexed as the bias adjustment signal terminal. By using the data line reset module 102 multiplexed as the bias adjustment module, the bias adjustment signal (i.e., the data line reset signal VD) may be written into the first electrode of the driving transistor DT in part of the operation time of the pixel circuit 10 to adjust the bias state of the driving transistor DT. The threshold drift problem of the driving transistor DT may be addressed, and the display effect may be improved. The first bias adjustment stage is executed before the data writing stage, and the execution time of the first bias adjustment stage may overlap with the execution time of the data line reset stage. The first bias adjustment stage may be set to be executed after the first reset stage (after moment Z2 shown in FIG. 24). After the reset of the first node N1 is completed in the first reset stage, the data line reset stage (moments Z4-Z6 shown in FIG. 24) may be executed, and the bias voltage adjustment may be completed simultaneously. Accordingly, the driving time of the panel may be saved, the refresh frequency of the panel may be increased, and high-frequency driving may be achieved.

Figure 29:
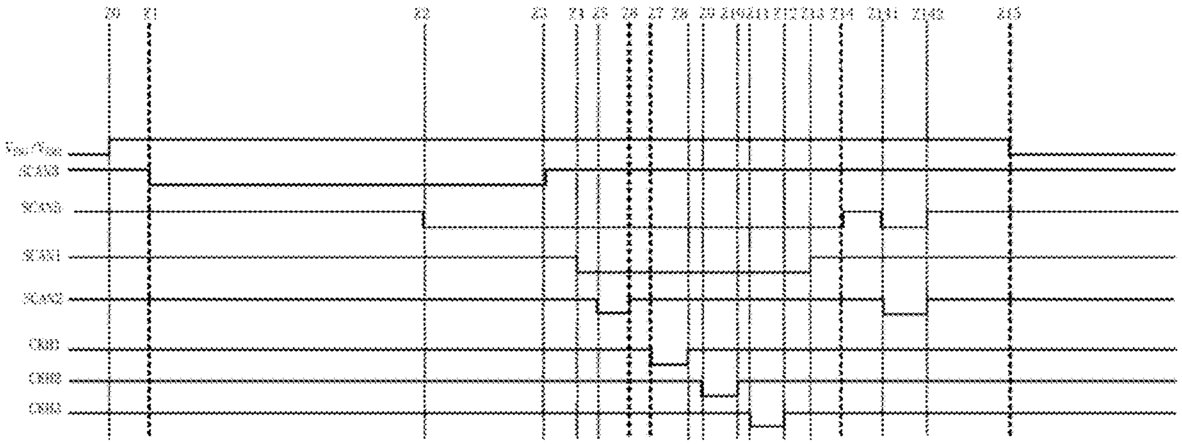
FIG. 29 illustrates another operation timing diagram of an electrical connection structure in FIG. 28, consistent with the disclosed embodiments of the present disclosure.

FIG. 29 illustrates another operation timing diagram of an electrical connection structure in FIG. 28. Referring to FIGS. 4, 27, 28 and 29, in one embodiment, the driving method also includes a second bias adjustment stage at moments Z141-Z142 as shown in FIG. 29. The second bias adjustment stage may be executed between the data writing stage and the light emitting stage (executed between moment Z14 and moment Z15). In the second bias adjustment stage, the data line reset module 102 is turned on. The data line reset signal VD may be provided to the first electrode of the driving transistor DT to adjust the bias state of the driving transistor DT.

In one embodiment, the driving method includes a second bias adjustment stage, and the second bias adjustment stage is executed between the data writing stage and the light emitting stage (executed between moment Z14 time and moment Z15). That is, the second bias adjustment stage may be performed after the data writing module 101 completes writing the data voltage signal and before the light emitting stage. Optionally, the bias adjustment signal Vbias may be a DC positive voltage signal. Regardless of the picture displayed in the previous frame, when writing the data voltage of a current screen, and before the light emitting stage after writing the data voltage of the current screen, the driving transistor DT needs to be written with the bias adjustment signal Vbias for one time. Since the bias adjustment signal Vbias is a high positive voltage value, the bias effect of the previous display frame may be weakened, making the state of the driving transistor DT closer to the default when writing the current display frame. By setting at least two bias adjustment stages in the operation cycle of the pixel circuit 10, the time for adjusting the bias state of the driving transistor DT in the driving cycle may be increased. Accordingly, the threshold voltage drift of the driving transistor DT caused by the hysteresis effect may be compensated. The difference in bias voltage of the driving transistor DT when displaying the current frame and the previous frame may be reduced. The threshold drift problem of the driving transistor DT may be addressed, and the display effect may be improved.

Figure 30:
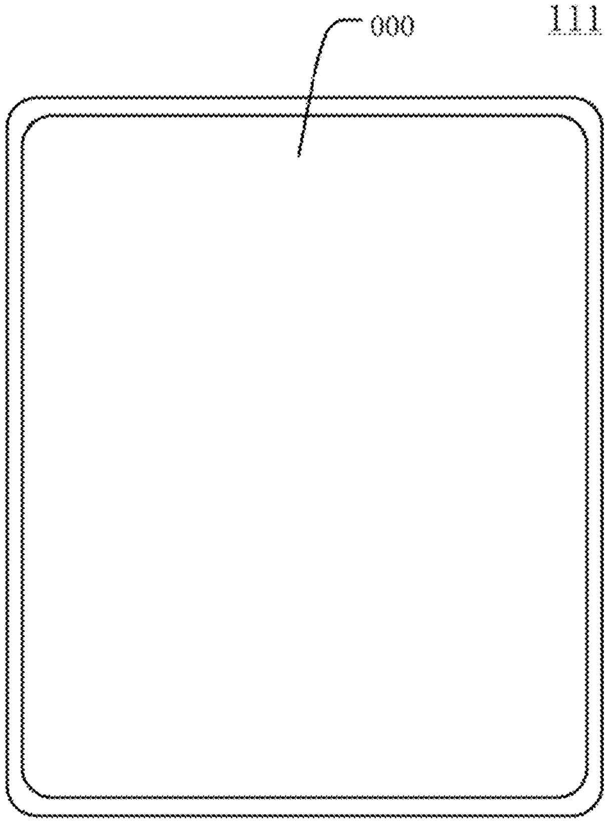
FIG. 30 illustrates a schematic plan view of a display device consistent with the disclosed embodiments of the present disclosure.

The present disclosure also provides a display device. FIG. 30 illustrates a schematic plan view of a display device consistent with the disclosed embodiments of the present disclosure. Referring to FIG. 30, in one embodiment, the display device 111 includes a display panel 000 provided by the present disclosure. FIG. 30 only takes a mobile phone as an example to illustrate the display device 111. It may be understood that the display device 111 provided by the present disclosure may be a computer, a television, a vehicle-mounted display device, or other display devices 111 with a display function. The present invention does not limit a specific type of display device. The display device 111 provided by the present disclosure has beneficial effects of the display panel 000 provided by the present disclosure. For details, reference may be made to specific descriptions of the display panel 000 in the present disclosure, which will not be elaborated here.

As disclosed, the technical solutions of the present disclosure have the following advantages.

The sub-pixel of the display panel provided by the present disclosure includes a pixel circuit and a light emitting element that are electrically connected. The pixel circuit includes a data writing module electrically connected to a driving transistor. The driving transistor may be used to generate driving current that drives the light emitting element to emit light, realizing the light emitting function of the light emitting element. The data writing module is electrically connected to the data line. The operation stage of the pixel circuit at least includes a data writing stage. In the data writing stage, the data writing module is turned on, and the data voltage signal transmitted on the data line is transmitted to the driving transistor.

The pixel circuit also includes a data line reset module. The first terminal of the data line reset module is electrically connected to the data line, and the second terminal of the data line reset module is electrically connected to a data line reset signal terminal. The data line reset signal terminal may be used to provide the data line reset signal. The operation stage of the pixel circuit also includes a data line reset stage. The data line reset stage is performed before the data writing stage. In the data line reset stage, the data line reset module is turned on, and the data line reset signal provided by the data line reset signal terminal may be transmitted to the data line to reset the data line. Accordingly, the data line reset signal provided by the data line reset signal terminal may be used to clear the residual data voltage value on the data line of a previous frame before a next frame starts to reset the data line. As such, the data voltage signal provided on the data line of the next frame may avoid interference by the residual value of the previous frame as much as possible. Then in the data writing stage of the next frame, the data voltage signal on the data line may be fast and fully written to the driving transistor through the data writing module. Accordingly, the problem of insufficient threshold compensation of drive transistors in the pixel circuit may be addressed, the display uniformity may be improved, and display quality may be improved. In addition, an increase of the time of the data writing stage may not be needed, and power consumption may thus be reduced.

The embodiments disclosed herein are exemplary only and not limiting the scope of the present disclosure. Various combinations, alternations, modifications, equivalents, or improvements to the technical solutions of the disclosed embodiments may be obvious to those skilled in the art.

Without departing from the spirit and scope of this disclosure, such combinations, alternations, modifications, equivalents, or improvements to the disclosed embodiments are encompassed within the scope of the present disclosure.

What is claimed is:

1. A display panel, comprising a plurality of sub-pixels and a plurality of data lines, wherein:

a sub-pixel of the plurality of sub-pixels includes a pixel circuit and a light emitting element electrically connected to the pixel circuit;

the pixel circuit includes a data writing module electrically connected to a driving transistor, and a data line reset module;

a first terminal of the data line reset module is electrically connected to a data line of the plurality of data lines, a second terminal of the data line reset module is electrically connected to a data line reset signal terminal, and the data writing module is electrically connected to the data line;

an operation stage of the pixel circuit at least includes a data writing stage, and in the data writing stage, the data writing module is turned on and transmits a data voltage signal of the data line to the driving transistor;

before the data writing stage, the operation stage also includes a data line reset stage, and in the data line reset stage, the data line reset module is turned on, and the data line reset signal terminal transmits a data line reset signal to the data line through the data line reset module; and the data line reset signal provided by the data line reset signal terminal electrically connected to the second terminal of the data line reset module is a low voltage signal VD, with VD<Vmin, wherein the light emitting element includes a blue light emitting element, and Vmin is a value of a data voltage signal required by the blue light emitting element at highest brightness.

2. A display panel, comprising a plurality of sub-pixels and a plurality of data lines, wherein:

a sub-pixel of the plurality of sub-pixels includes a pixel circuit and a light emitting element electrically connected to the pixel circuit;

the pixel circuit includes a data writing module electrically connected to a driving transistor, and a data line reset module;

a first terminal of the data line reset module is electrically connected to a data line of the plurality of data lines, a second terminal of the data line reset module is electrically connected to a data line reset signal terminal, and the data writing module is electrically connected to the data line;

an operation stage of the pixel circuit at least includes a data writing stage, and in the data writing stage, the data writing module is turned on and transmits a data voltage signal of the data line to the driving transistor;

before the data writing stage, the operation stage also includes a data line reset stage, and in the data line reset stage, the data line reset module is turned on, and the data line reset signal terminal transmits a data line reset signal to the data line through the data line reset module; and the pixel circuit further includes a reset module, wherein, a first terminal of the reset module is electrically connected to a reference voltage signal terminal, a second terminal of the reset module is electrically connected to a gate of the driving transistor, and the data line reset signal terminal is electrically connected to the reference voltage signal terminal.

3. A display panel, comprising a plurality of sub-pixels; a plurality of data lines; and a multiplexing circuit, wherein:

a sub-pixel of the plurality of sub-pixels includes a pixel circuit and a light emitting element electrically connected to the pixel circuit;

the pixel circuit includes a data writing module electrically connected to a driving transistor, and a data line reset module;

a first terminal of the data line reset module is electrically connected to a data line of the plurality of data lines, a second terminal of the data line reset module is electrically connected to a data line reset signal terminal, and the data writing module is electrically connected to the data line;

an operation stage of the pixel circuit at least includes a data writing stage, and in the data writing stage, the data writing module is turned on and transmits a data voltage signal of the data line to the driving transistor;

before the data writing stage, the operation stage also includes a data line reset stage, and in the data line reset stage, the data line reset module is turned on, and the data line reset signal terminal transmits a data line reset signal to the data line through the data line reset module;

a first terminal of the data writing module is electrically connected to a first electrode of the driving transistor, a second terminal of the data writing module is electrically connected to a terminal of the data line, and another terminal of the data line is electrically connected to an output terminal of the multiplexing circuit; and in the data writing stage, a conduction period of the multiplexing circuit overlaps with a conduction period of the data writing module.

4. The display panel according to claim 3, wherein:

the first terminal of the data line reset module is electrically connected to the first electrode of the driving transistor, and the first terminal of the data line reset module is electrically connected to the first terminal of the data writing module; and in the data line reset stage, the data writing module is turned on.

5. The display panel according to claim 3, wherein:

the data writing module includes a first transistor, wherein a gate of the first transistor is electrically connected to a first scan signal terminal, a first electrode of the first transistor is electrically connected to the first electrode of the driving transistor, and a second electrode of the first transistor is electrically connected to the data line;

the data line reset module includes a second transistor, wherein a gate of the second transistor is electrically connected to a second scan signal terminal, a first electrode of the second transistor is electrically connected to the first electrode of the driving transistor, and a second electrode of the second transistor is electrically connected to the data line reset signal terminal;

in the data line reset stage, the first scan signal terminal provides a first scan signal to control the first transistor to turn on, the second scan signal terminal provides a second scan signal to control the second transistor to turn on, and the data line reset signal is transmitted to the data line; and in the data writing stage, the first scan signal terminal provides the first scan signal to control the first transistor to turn on, the second scan signal terminal provides the second scan signal to control the second transistor to turn off, the multiplexing circuit is turned on, and the data voltage signal of the data line is transmitted to the driving transistor.

6. The display panel according to claim 5, wherein:

the pixel circuit further includes a first light emitting control module, a second light emitting control module, a first reset module, a second reset module, and a threshold compensation module, wherein:

a first terminal of the first light emitting control module is electrically connected to a first power signal terminal, and a second terminal of the first light emitting control module is electrically connected to the first electrode of the driving transistor;

a first terminal of the second light emitting control module is electrically connected to the second electrode of the driving transistor, a second terminal of the second light emitting control module is electrically connected to an anode of the light emitting element, and a cathode of the light emitting element is connected to a second power signal terminal;

a first terminal of the first reset module is electrically connected to a first reference voltage signal terminal, and a second terminal of the first reset module is electrically connected to a gate of the driving transistor;

a first terminal of the second reset module is electrically connected to a second reference voltage signal terminal, and a second terminal of the second reset module is electrically connected to the anode of the light emitting element; and the threshold compensation module is electrically connected between the gate of the driving transistor and the second electrode of the driving transistor.

7. The display panel according to claim 6, wherein:

the first light emitting control module includes a third transistor, wherein a gate of the third transistor is electrically connected to a first light emitting control signal terminal, a first electrode of the third transistor is electrically connected to the first power signal terminal, and a second electrode of the third transistor is electrically connected to the first electrode of the driving transistor;

the second light emitting control module includes a fourth transistor, wherein a gate of the fourth transistor is electrically connected to a second light emitting control signal terminal, a first electrode of the fourth transistor is electrically connected to the second electrode of the driving transistor, and a second electrode of the fourth transistor is electrically connected to the anode of the light emitting element;

the first reset module includes a fifth transistor, wherein a gate of the fifth transistor is electrically connected to a third scan signal terminal, a first electrode of the fifth transistor is electrically connected to the first reference voltage signal terminal, and a second electrode of the fifth transistor is electrically connected to the gate electrode of the driving transistor;

the second reset module includes a sixth transistor, wherein a gate of the sixth transistor is electrically connected to a fourth scan signal terminal, a first electrode of the sixth transistor is connected to the second reference voltage signal terminal, a second electrode of the sixth transistor is electrically connected to the anode of the light emitting element, and the cathode of the light emitting element is connected to the second power signal terminal; and the threshold compensation module includes a seventh transistor, wherein a gate of the seventh transistor is electrically connected to a fifth scan signal terminal, a first electrode of the seventh transistor is electrically connected to the gate of the driving transistor, and a second electrode of the seventh transistor is electrically connected to the second electrode of the driving transistor.

8. The display panel according to claim 7, wherein:

the first transistor, the second transistor, the driving transistor, the third transistor, the fourth transistor, the fifth transistor, the sixth transistor, and the seventh transistor each are P-type low temperature polysilicon transistors; or the first transistor, the second transistor, the driving transistor, the third transistor, the fourth transistor, and the sixth transistor each are P-type low-temperature polysilicon transistors, and the fifth transistor and the seventh transistor each are N-type oxide transistors.

9. The display panel according to claim 6, wherein:

the pixel circuit further includes a memory module, wherein:

the memory module is electrically connected between the first power signal terminal and the gate of the driving transistor; and the memory module includes a first capacitor, wherein a first electrode of the first capacitor is electrically connected to the gate of the driving transistor, and a second electrode of the first capacitor is electrically connected to the first power signal terminal.

10. The display panel according to claim 5, wherein:

the pixel circuit further includes a second reset module, wherein:

the second reset module includes a sixth transistor, wherein a gate of the sixth transistor is electrically connected to the second scan signal terminal, a first electrode of the sixth transistor is electrically connected to the second reference voltage signal terminal, a second electrode of the sixth transistor is electrically connected to the anode of the light emitting element, and the cathode of the light emitting element is connected to the second power signal terminal; and a conduction period of the data line reset module and a conduction period of the second reset module at least partially overlap.

11. The display panel according to claim 3, wherein:

the multiplexing circuit includes a plurality of multiplexing units, and each multiplexing unit of the plurality of multiplexing units includes a plurality of control terminals, a signal input terminal, and a plurality of signal output terminals, wherein:

a control terminal of the plurality of control terminals is connected to a control signal, the signal input terminal receives the data voltage signal, and the plurality of signal output terminals is connected to different data lines of the plurality of data lines respectively; and in a multiplexing unit of the plurality of signal output terminals, a ratio of the quantities of the signal input terminal and the plurality of signal output terminals is 1:N, wherein Nis an integer and N≥2.

12. The display panel according to claim 3, wherein:

the second terminals of the data writing modules of the sub-pixels in a same column are connected to two different data lines of the plurality of data lines, and the two different data lines corresponding to the sub-pixels in a same column include a first data line and a second data line; and among the sub-pixels in a same column, the second terminal of the data writing module of an n-th row sub-pixel is connected to the first data line, and a second terminal of the data writing module of an (n+1)-th row sub-pixel is connected to the second data line, wherein n is a positive integer.

13. A display panel, comprising a plurality of sub-pixels; a plurality of data lines; and a bias adjustment module, wherein:

a sub-pixel of the plurality of sub-pixels includes a pixel circuit and a light emitting element electrically connected to the pixel circuit;

the pixel circuit includes a data writing module electrically connected to a driving transistor, and a data line reset module;

a first terminal of the data line reset module is electrically connected to a data line of the plurality of data lines, a second terminal of the data line reset module is electrically connected to a data line reset signal terminal, and the data writing module is electrically connected to the data line;

an operation stage of the pixel circuit at least includes a data writing stage, and in the data writing stage, the data writing module is turned on and transmits a data voltage signal of the data line to the driving transistor;

before the data writing stage, the operation stage also includes a data line reset stage, and in the data line reset stage, the data line reset module is turned on, and the data line reset signal terminal transmits a data line reset signal to the data line through the data line reset module; and a first terminal of the bias adjustment module is electrically connected to the first electrode of the driving transistor, and a second terminal of the bias adjustment module is electrically connected to a bias adjustment signal terminal.

14. A driving method for a display panel, comprising a data line reset stage and a data writing stage, wherein:

the display panel includes a plurality of sub-pixels and a plurality of data lines, wherein a sub-pixel of the plurality of sub-pixels includes a pixel circuit and a light emitting element electrically connected to the pixel circuit, the pixel circuit includes a data writing module electrically connected to a driving transistor and a data line reset module, a first terminal of the data line reset module is electrically connected to a data line of the plurality of data lines, a second terminal of the data line reset module is electrically connected to a data line reset signal terminal, and the data writing module is electrically connected to the data line;

the data line reset stage is executed before the data writing stage;

in the data line reset stage, the data line reset module is turned on, and the data line reset signal terminal transmits a data line reset signal to the data line through the data line reset module to reset the data line;

in the data writing stage, the data writing module is turned on, and transmits a data voltage signal of the data line to the driving transistor;

the display panel further includes a multiplexing circuit;

a first terminal of the data writing module is electrically connected to a first electrode of the driving transistor, a second terminal of the data writing module is electrically connected to a terminal of the data line, and another terminal of the data line is electrically connected to an output terminal of the multiplexing circuit; and in the data writing stage, the data writing module is turned on, the data line reset module is turned off, the multiplexing circuit is turned on, the multiplexing circuit transmits the data voltage signal to the data line and then to the driving transistor through the data line.

15. A driving method for a display panel, comprising a data line reset stage and a data writing stage, wherein:

the display panel includes a plurality of sub-pixels and a plurality of data lines, wherein a sub-pixel of the plurality of sub-pixels includes a pixel circuit and a light emitting element electrically connected to the pixel circuit, the pixel circuit includes a data writing module electrically connected to a driving transistor and a data line reset module, a first terminal of the data line reset module is electrically connected to a data line of the plurality of data lines, a second terminal of the data line reset module is electrically connected to a data line reset signal terminal, and the data writing module is electrically connected to the data line;

the data line reset stage is executed before the data writing stage;

in the data line reset stage, the data line reset module is turned on, and the data line reset signal terminal transmits a data line reset signal to the data line through the data line reset module to reset the data line;

in the data writing stage, the data writing module is turned on, and transmits a data voltage signal of the data line to the driving transistor;

the pixel circuit further includes a first light emitting control module, a second light emitting control module, a first reset module, a second reset module, and a threshold compensation module;

a first terminal of the first light emitting control module is electrically connected to a first power signal terminal, and a second terminal of the first light emitting control module is electrically connected to the first electrode of the driving transistor;

a first terminal of the second light emitting control module is electrically connected to a second electrode of the driving transistor, a second terminal of the second light emitting control module is electrically connected to an anode of the light emitting element, and a cathode of the light emitting element is electrically connected to a second power signal terminal;

a first terminal of the first reset module is electrically connected to a first reference voltage signal terminal, and a second terminal of the first reset module is electrically connected to a gate of the driving transistor;

a first terminal of the second reset module is electrically connected to a second reference voltage signal terminal, and a second terminal of the second reset module is electrically connected to the anode of the light emitting element;

the threshold compensation module is electrically connected between the gate electrode of the driving transistor and the second electrode of the driving transistor;

the driving method further includes a first reset stage, a second reset stage and a light emitting stage, and the data writing stage is executed between the second reset stage and the light emitting stage;

in the first reset stage, the first reset module is turned on, and a first reset signal provided by the first reference voltage signal terminal is transmitted to the gate of the driving transistor to reset the gate of the driving transistor;

in the second reset stage, the second reset module is turned on, and a second reset signal provided by the second reference voltage signal terminal is transmitted to the anode of the light emitting element to reset the anode of the light emitting element;

in the light emitting stage, the first light emitting control module, the second light emitting control module, and the driving transistor are turned on, and driving current generated by the driving transistor is transmitted to the light emitting element to drive the light emitting element to emit light; and the threshold compensation module detects and self-compensates for a deviation of a threshold voltage of the driving transistor in the data writing stage.

16. The driving method according to claim 15, wherein:

an execution period of the data line reset stage and an execution period of the second reset stage at least partially overlap.

17. The driving method according to claim 15, wherein:

the display panel further includes a bias adjustment module, wherein a first terminal of the bias adjustment module is electrically connected to the first electrode of the driving transistor, and a second terminal of the bias adjustment module is electrically connected to a bias adjustment signal terminal;

the data line reset module is multiplexed as the bias adjustment module, and the data line reset signal terminal is multiplexed as the bias adjustment signal terminal;

the driving method further includes a first bias adjustment stage, and the first bias adjustment stage is executed before the data writing stage; and in the first bias adjustment stage, the data line reset module is turned on, and the data line reset signal is provided to the first electrode of the driving transistor to adjust the bias state of the driving transistor.

18. The driving method according to claim 17, wherein:

the first bias adjustment stage is executed after the first reset stage.

19. The driving method according to claim 17, further comprising a second bias adjustment stage, wherein:

the second bias adjustment stage is executed between the data writing stage and the light emitting stage; and in the second bias adjustment stage, the data line reset module is turned on, and the data line reset signal is provided to the first electrode of the driving transistor to adjust the bias state of the driving transistor.

* * * * *